US012184109B2

(12) United States Patent
Aoyama et al.

(10) Patent No.: US 12,184,109 B2
(45) Date of Patent: Dec. 31, 2024

(54) POWER SUPPLY UNIT FOR AEROSOL GENERATION DEVICE

(71) Applicant: Japan Tobacco Inc., Tokyo (JP)

(72) Inventors: Tatsunari Aoyama, Tokyo (JP); Hiroshi Kawanago, Tokyo (JP); Toru Nagahama, Tokyo (JP); Takashi Fujiki, Tokyo (JP); Ryo Yoshida, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 0 days.

(21) Appl. No.: 18/502,046

(22) Filed: Nov. 5, 2023

(65) Prior Publication Data

US 2024/0079893 A1 Mar. 7, 2024

Related U.S. Application Data

(63) Continuation of application No. PCT/JP2022/009447, filed on Mar. 4, 2022.

(30) Foreign Application Priority Data

May 10, 2021 (JP) ................................ 2021-079870

(51) Int. Cl.
*H02J 7/00* (2006.01)
*A24F 40/465* (2020.01)
(Continued)

(52) U.S. Cl.
CPC .......... *H02J 7/0068* (2013.01); *A24F 40/465* (2020.01); *A24F 40/51* (2020.01);
(Continued)

(58) Field of Classification Search
CPC .................................................... H02J 7/0068
(Continued)

(56) References Cited

U.S. PATENT DOCUMENTS

2015/0020831 A1 1/2015 Weigensberg et al.
2019/0387803 A1* 12/2019 Yamada ................. A24F 40/95
(Continued)

FOREIGN PATENT DOCUMENTS

| | | | |
|---|---|---|---|
| JP | 2015-500647 | A | 1/2015 |
| JP | 6833093 | B1 | 2/2021 |
| JP | 6864141 | B1 | 4/2021 |
| JP | 6865879 | B1 | 4/2021 |
| WO | 2018/167817 | A1 | 9/2018 |

OTHER PUBLICATIONS

International Search Report and Written Opinion mailed on Apr. 19, 2022, received for PCT Application PCT/JP2022/009447, filed on Mar. 4, 2022, 8 pages including English Translation.

(Continued)

*Primary Examiner* — Jerry D Robbins
(74) *Attorney, Agent, or Firm* — XSENSUS LLP

(57) ABSTRACT

A power supply unit for an aerosol generation device that generates an aerosol by heating an aerosol source, the power supply unit including: a power supply; a connector electrically connectable to an external power supply; a first load; a charging IC including an input terminal connected to the connector, a charging terminal connected to the power supply, and an output terminal connected to the first load, and configured to convert electric power input to the input terminal and output the converted electric power from the charging terminal; and a discharge path configured to connect the power supply and a second load without passing through the charging IC, in which the charging IC is configured to supply electric power input from the power supply to the charging terminal to the first load via the output terminal.

16 Claims, 20 Drawing Sheets

(51) Int. Cl.

| | |
|---|---|
| ***A24F 40/51*** | (2020.01) |
| ***A24F 40/53*** | (2020.01) |
| ***A24F 40/95*** | (2020.01) |
| *A24F 40/20* | (2020.01) |
| *A24F 40/65* | (2020.01) |

(52) U.S. Cl.
CPC .............. *A24F 40/53* (2020.01); *A24F 40/95* (2020.01); *A24F 40/20* (2020.01); *A24F 40/65* (2020.01); *H02J 2207/10* (2020.01)

(58) Field of Classification Search
USPC .......................................................... 320/135
See application file for complete search history.

(56) References Cited

U.S. PATENT DOCUMENTS

| | | | | |
|---|---|---|---|---|
| 2020/0046021 | A1* | 2/2020 | Sur | H02J 7/00304 |
| 2020/0120991 | A1 | 4/2020 | Hatton et al. | |
| 2020/0163389 | A1* | 5/2020 | Sur | A24F 40/48 |
| 2021/0005940 | A1* | 1/2021 | Welch | H01M 10/44 |
| 2022/0105284 | A1* | 4/2022 | Lahoud | A24F 40/44 |
| 2022/0229453 | A1* | 7/2022 | Blackmon | G05B 15/02 |

OTHER PUBLICATIONS

Decision to Grant mailed on Jul. 25, 2023, received for JP Application 2023-520830, 5 pages including English Translation.

* cited by examiner

POWER SUPPLY UNIT FOR AEROSOL GENERATION DEVICE

CROSS-REFERENCE TO RELATED APPLICATIONS

This application is a continuation of International Patent Application No. PCT/JP2022/009447 filed on Mar. 4, 2022, claiming priority to Japanese Patent Application No. 2021-079870 filed on May 10, 2021, the content of each is incorporated herein by reference.

TECHNICAL FIELD

The disclosure relates to a power supply unit for an aerosol generation device.

BACKGROUND ART

US2020/0120991A describes an evaporator device having a converter capable of receiving a voltage from a USB power supply or a battery and supplying the received voltage to a heating element. The converter is configured to charge a battery with the voltage from the USB power supply.

WO2018/167817 describes a smoking system including a primary device including a primary power supply and a charging device that charges the primary power supply, and a secondary device including a secondary power supply charged by the primary power supply and a load that generates heat by power supply from the secondary power supply. In the smoking system, direct power supply from the primary power supply to the load is possible.

JP2015-500647A describes an electronic cigarette capable of supplying electric power from a charger to a heating element of a cigarette cartridge.

In a case where a charging IC is provided in an aerosol generation device equipped with a power supply, it is conceivable to supply electric power from an external power supply or a built-in power supply to a load such as a heater or a controller using a Power Path function of the charging IC. However, when a load connected to an output terminal of the charging IC increases, a current output from the output terminal increases, and it is necessary to use a large-scale and high-cost charging IC.

One of the objects of the disclosure is to provide an aerosol generation device capable of realizing miniaturization and cost reduction.

SUMMARY OF INVENTION

According to an aspect of the disclosure, there is provided a power supply unit for an aerosol generation device that generates an aerosol by heating an aerosol source, the power supply unit including: a power supply; a connector electrically connected to an external power supply; a first load; a charging IC including an input terminal connected to the connector, a charging terminal connected to the power supply, and an output terminal connected to the first load, and configured to convert electric power input to the input terminal and output the converted electric power from the charging terminal; and a discharge path configured to connect the power supply and a second load without passing through the charging IC, in which the charging IC is configured to supply electric power input from the power supply to the charging terminal to the first load via the output terminal.

DESCRIPTION OF EMBODIMENTS

Hereinafter, an inhalation system as an embodiment of an aerosol generation device in the disclosure will be described with reference to the drawings. The inhalation system includes a non-combustion-type inhaler 100 (hereinafter, also simply referred to as an "inhaler 100") as an embodiment of a power supply unit of the disclosure, and a rod 500 heated by the inhaler 100. In the following description, a configuration in which the inhaler 100 accommodates a heating unit in a non-detachable manner will be described as an example. However, the heating unit may be detachably attached to the inhaler 100. For example, the rod 500 and the heating unit may be integrated and detachably attached to the inhaler 100. That is, the power supply unit for the aerosol generation device may not include the heating unit as a component. The term "non-detachable" refers to a mode in which detachment cannot be performed within the intended use. Alternatively, an induction heating coil provided in the inhaler 100 and a susceptor built in the rod 500 may cooperate to constitute the heating unit.

Figure 1:
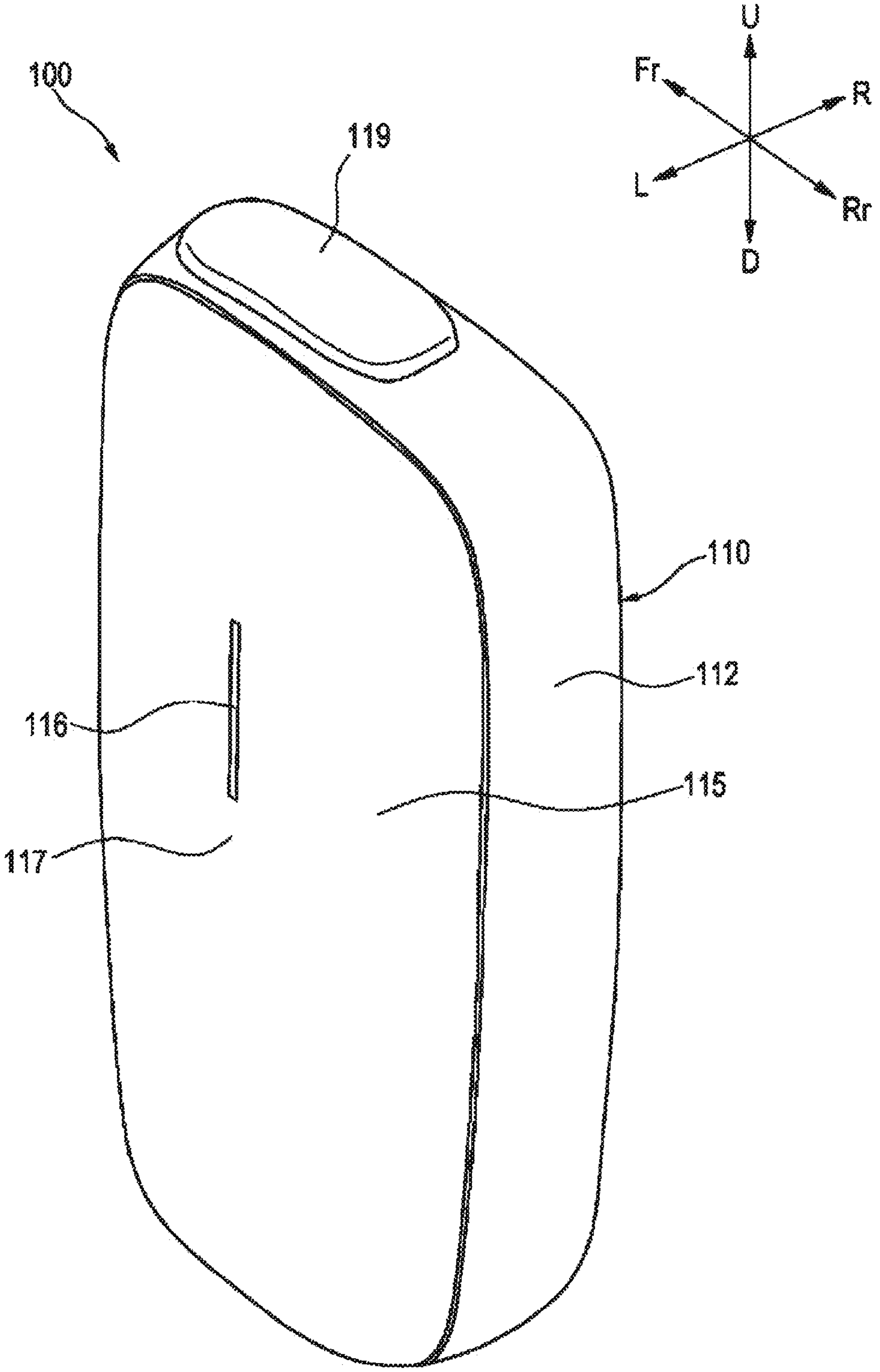
FIG. 1 is a perspective view of a non-combustion-type inhaler.
Figure 2:
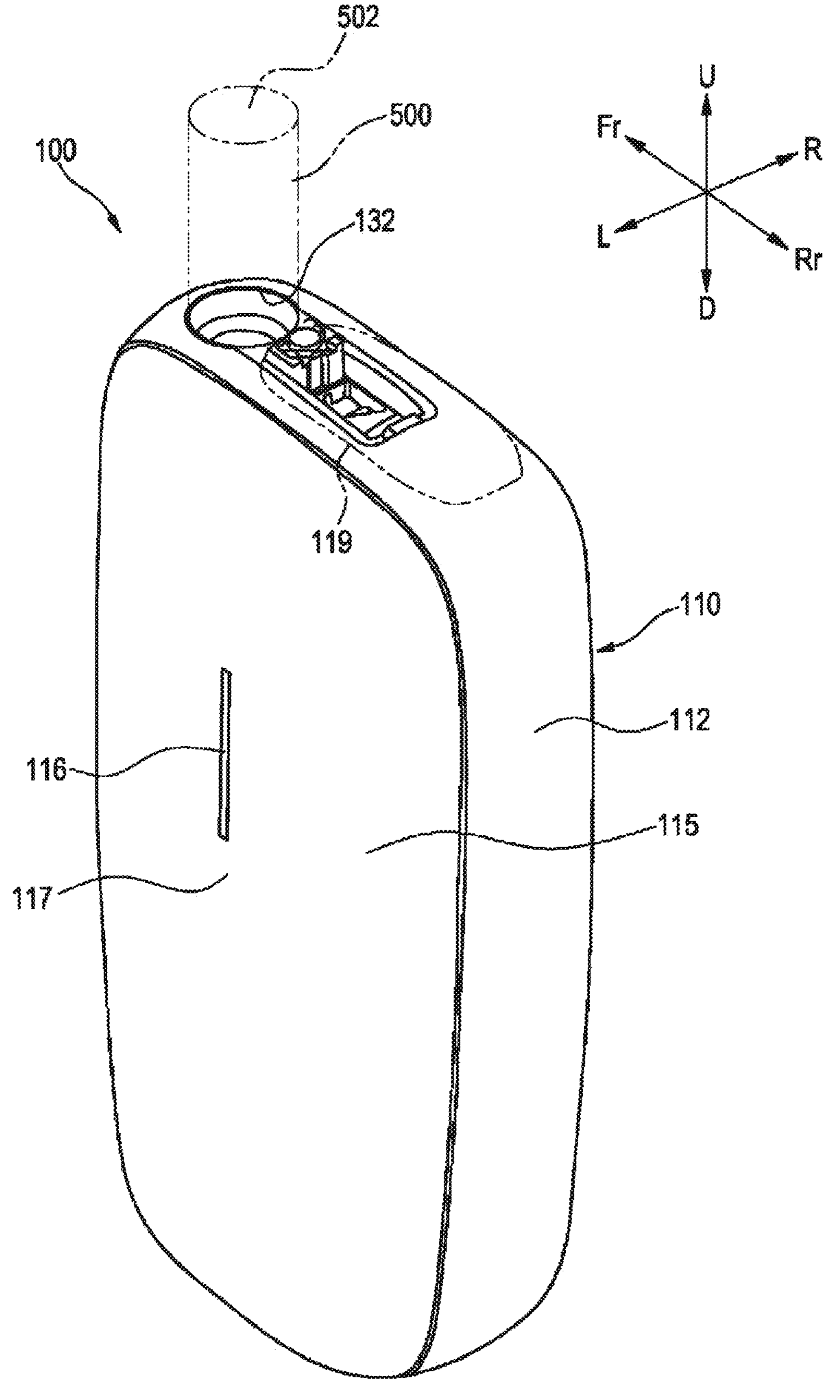
FIG. 2 is a perspective view of the non-combustion-type inhaler with a rod mounted thereon.
Figure 3:
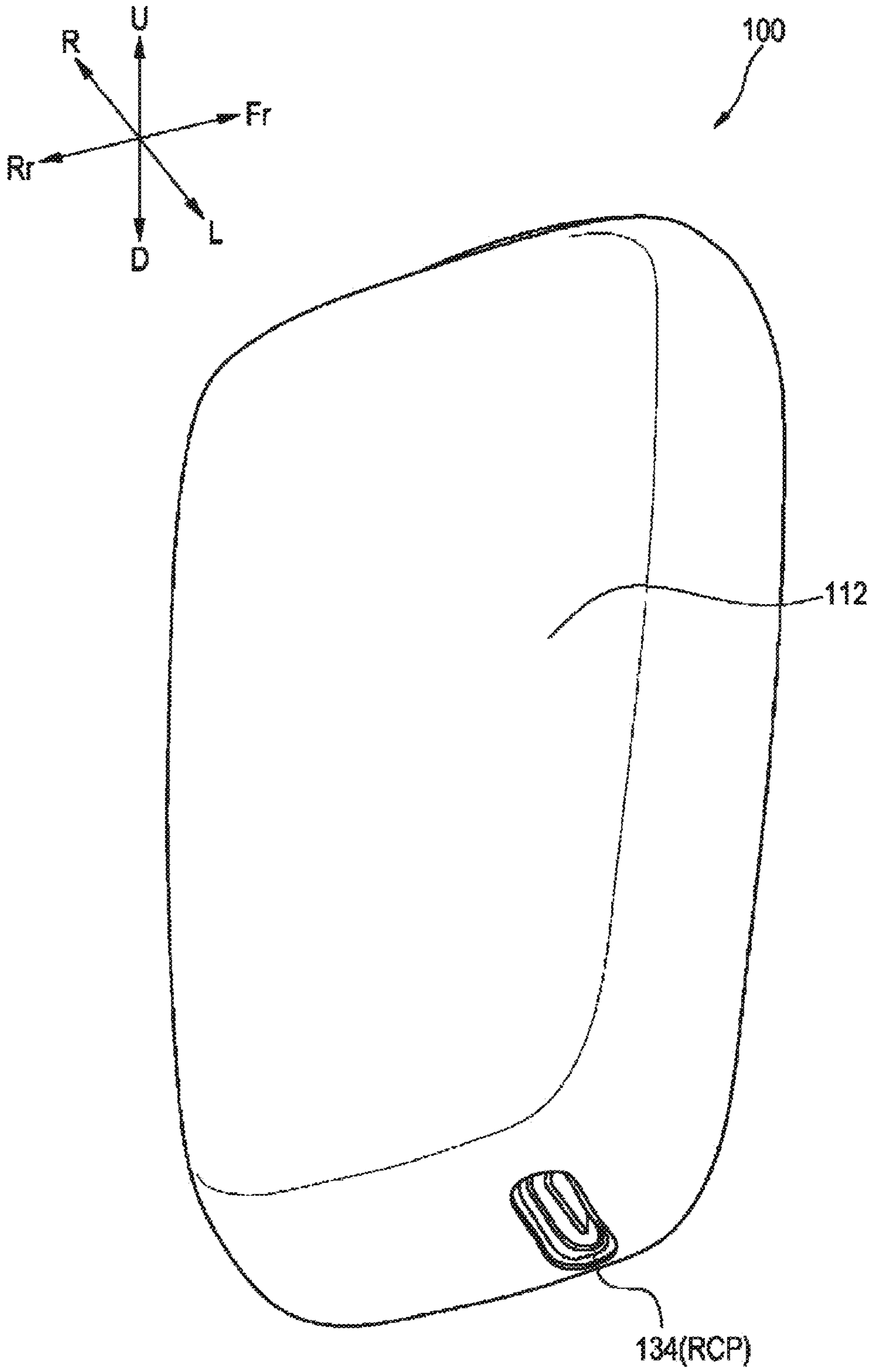
FIG. 3 is another perspective view of the non-combustion-type inhaler.
Figure 4:
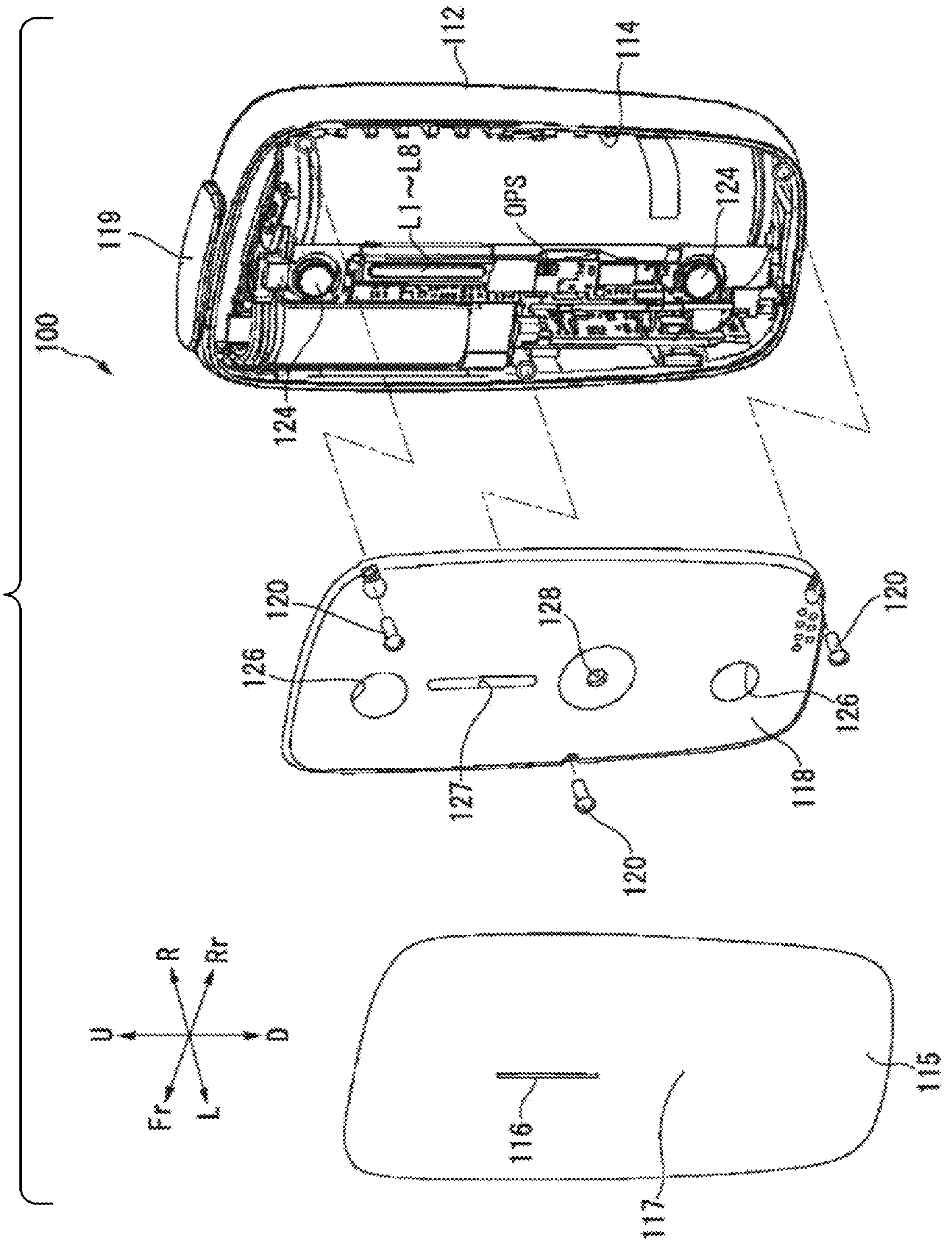
FIG. 4 is an exploded perspective view of the non-combustion-type inhaler.

FIG. 1 is a perspective view showing an overall configuration of the inhaler 100. FIG. 2 is a perspective view of the inhaler 100 with the rod 500 mounted thereon. FIG. 3 is another perspective view of the inhaler 100. FIG. 4 is an exploded perspective view of the inhaler 100. In the following description, for the sake of convenience, an orthogonal coordinate system of a three-dimensional space is used in which three directions orthogonal to each other are defined as a front-rear direction, a left-right direction, and an up-down direction. In the drawings, Fr denotes the front, Rr denotes the rear, R denotes the right, L denotes the left, U denotes the upper, and D denotes the lower.

The inhaler 100 is configured to generate an aerosol containing a flavor by heating an elongated and substantially columnar rod 500 (see FIG. 2) as an example of a flavor component generating base material, which has a filler containing an aerosol source and a flavor source.

<Flavor Component Generating Base Material (Rod)>

The rod 500 includes a filler containing an aerosol source that is heated at a predetermined temperature to generate an aerosol.

The type of the aerosol source is not particularly limited, and an extract substance from various natural products and/or a constituent component thereof can be selected according to the application. The aerosol source may be a solid, or may be, for example, a polyhydric alcohol such as glycerin or propylene glycol, or a liquid such as water. The aerosol source may contain a flavor source such as a cigarette raw material or an extract derived from the cigarette raw material that releases a flavor component by heating. Gas to which the flavor component is added is not limited to the aerosol, and for example, an invisible vapor may be generated.

The filler of the rod 500 may contain cut tobacco as a flavor source. A material of the cut tobacco is not particularly limited, and known materials such as a lamina and a backbone can be used. The filler may contain one kind or two or more kinds of fragrances. The type of the fragrance is not particularly limited, but is preferably menthol from a viewpoint of imparting good taste. The flavor source may contain a plant other than tobacco (for example, mints, herbal medicines, or herbs). Depending on the application, the rod 500 may not include a flavor source.

<Overall Configuration of Non-Combustion-Type Inhaler>

Next, the overall configuration of the inhaler 100 will be described with reference to FIGS. 1 to 4.

The inhaler 100 includes a substantially rectangular case 110 having a front surface, a rear surface, a left surface, a right surface, an upper surface, and a lower surface. The case 110 includes a bottomed cylindrical case body 112 in which the front surface, the rear surface, the upper surface, the lower surface, and the right surface are integrally formed, an outer panel 115 and an inner panel 118 that seal an opening 114 (see FIG. 4) of the case body 112 and form the left surface, and a slider 119.

The inner panel 118 is fixed to the case body 112 by bolts 120. The outer panel 115 is fixed to the case body 112 so as to cover an outer surface of the inner panel 118 by magnets 124 held on a chassis 150 (see FIG. 5) to be described later accommodated in the case body 112. Since the outer panel 115 is fixed by the magnets 124, the user can replace the outer panel 115 as desired.

The inner panel 118 is provided with two through holes 126 through which the magnets 124 pass. The inner panel 118 is further provided with a vertically long hole 127 and a circular hole 128 between the two through holes 126 arranged vertically. The long hole 127 is for transmitting light emitted from eight light emitting diodes (LEDs) L1 to L8 built in the case body 112. A button-type operation switch OPS built in the case body 112 passes through the circular hole 128. Accordingly, a user can detect the light emitted from the eight LEDs L1 to L8 through a LED window 116 of the outer panel 115. Further, the user can press down the operation switch OPS via a pressing portion 117 of the outer panel 115.

As shown in FIG. 2, an opening 132 into which the rod 500 can be inserted is provided in the upper surface of the case body 112. The slider 119 is coupled to the case body 112 so as to be movable in the front-rear direction between a position (see FIG. 1) where the opening 132 is closed and a position (see FIG. 2) where the opening 132 is opened.

The operation switch OPS is used to perform various operations of the inhaler 100. For example, the user operates the operation switch OPS via the pressing portion 117 in a state in which the rod 500 is inserted into the opening 132 and mounted as shown in FIG. 2. Accordingly, the rod 500 is heated by the heating unit 170 (see FIG. 5) without being burned. When the rod 500 is heated, an aerosol is generated from the aerosol source included in the rod 500, and the flavor of the flavor source included in the rod 500 is added to the aerosol. The user can inhale the aerosol containing the flavor by holding a mouthpiece 502 of the rod 500 protruding from the opening 132.

As shown in FIG. 3, a charging terminal 134 that is electrically connected to an external power supply such as an outlet or a mobile battery and receives power supply is provided on the lower surface of the case body 112. In the present embodiment, the charging terminal 134 is a universal serial bus (USB) Type-C receptacle, but is not limited thereto. The charging terminal 134 is hereinafter also referred to as a receptacle RCP.

The charging terminal 134 may include, for example, a power receiving coil, and may be configured to receive electric power transmitted from an external power supply in a noncontact manner. In this case, a method of wireless power transfer may be an electromagnetic induction type, a magnetic resonance type, or a combination of the electromagnetic induction type and the magnetic resonance type. As another example, the charging terminal 134 may be connectable to various USB terminals or the like, and may include the power receiving coil described above.

The configuration of the inhaler 100 shown in FIGS. 1 to 4 is merely an example. The inhaler 100 can be configured in various forms in which the rod 500 is held and an action such as heating is applied to generate a gas to which a flavor component is added from the rod 500, and the user can inhale the generated gas.

<Internal Configuration of Non-Combustion-Type Inhaler>

An internal unit 140 of the inhaler 100 will be described with reference to FIGS. 5 to 8.

Figure 5:
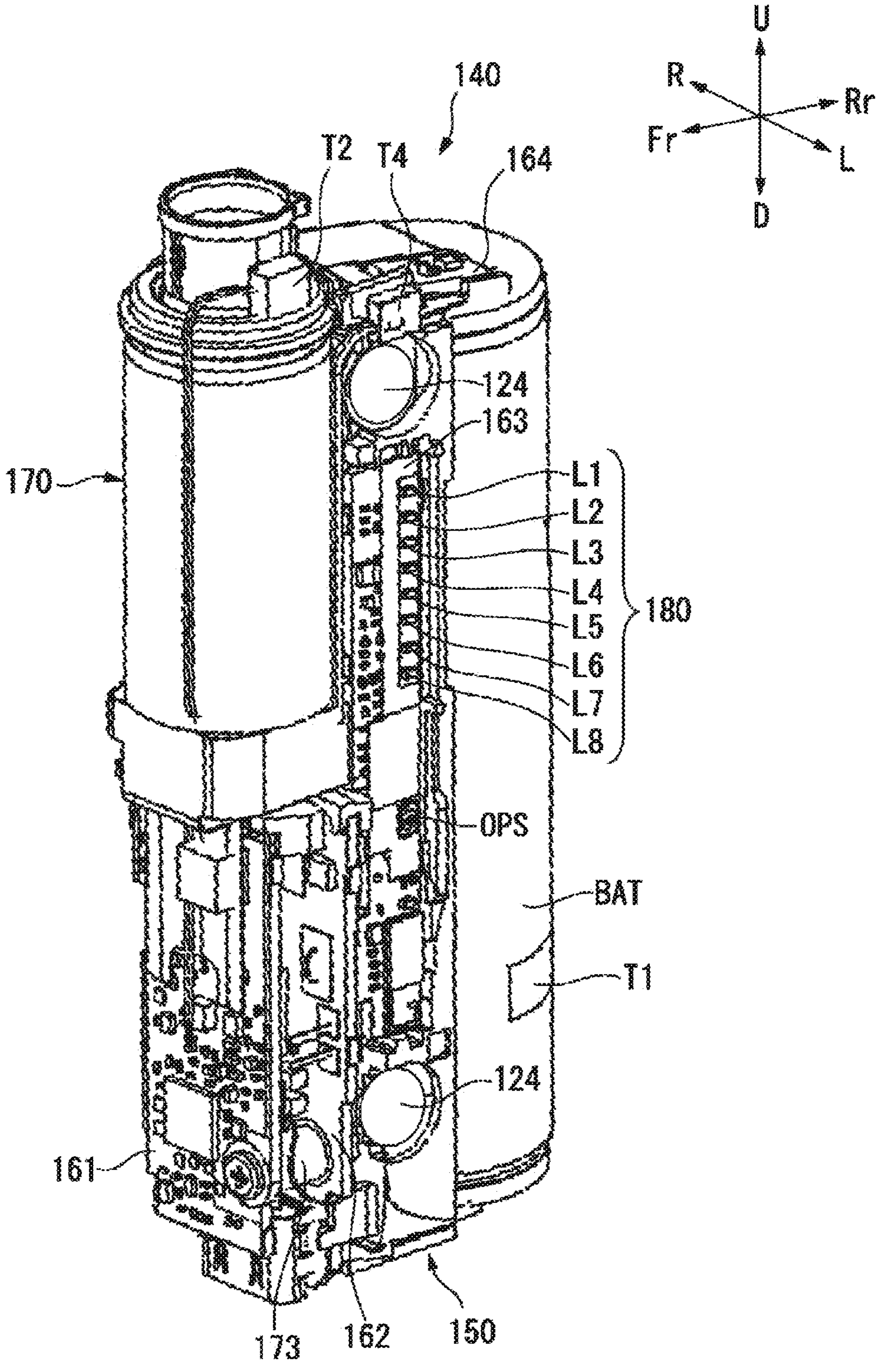
FIG. 5 is a perspective view of an internal unit of the non-combustion-type inhaler.
Figure 6:
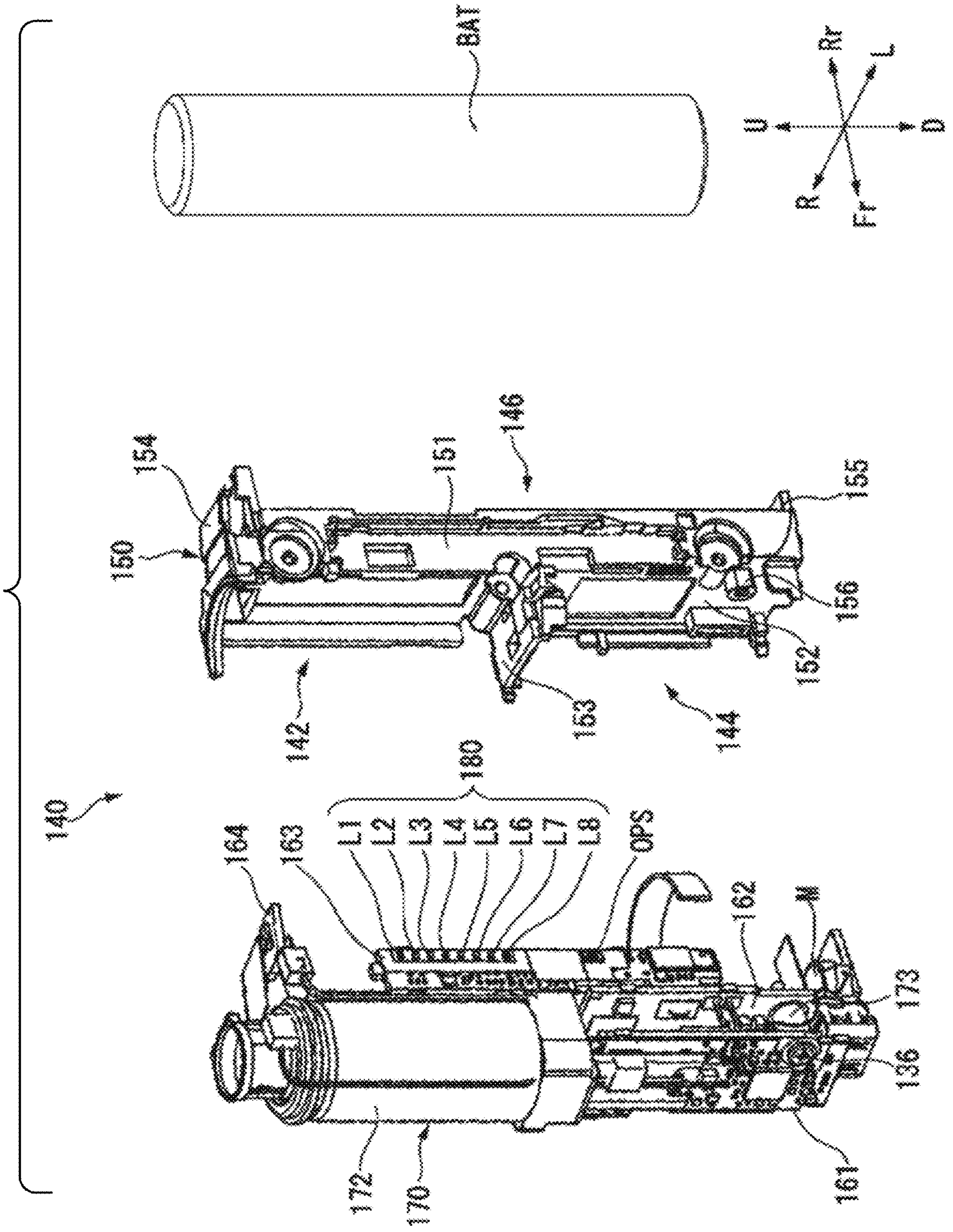
FIG. 6 is an exploded perspective view of the internal unit of FIG. 5.
Figure 7:
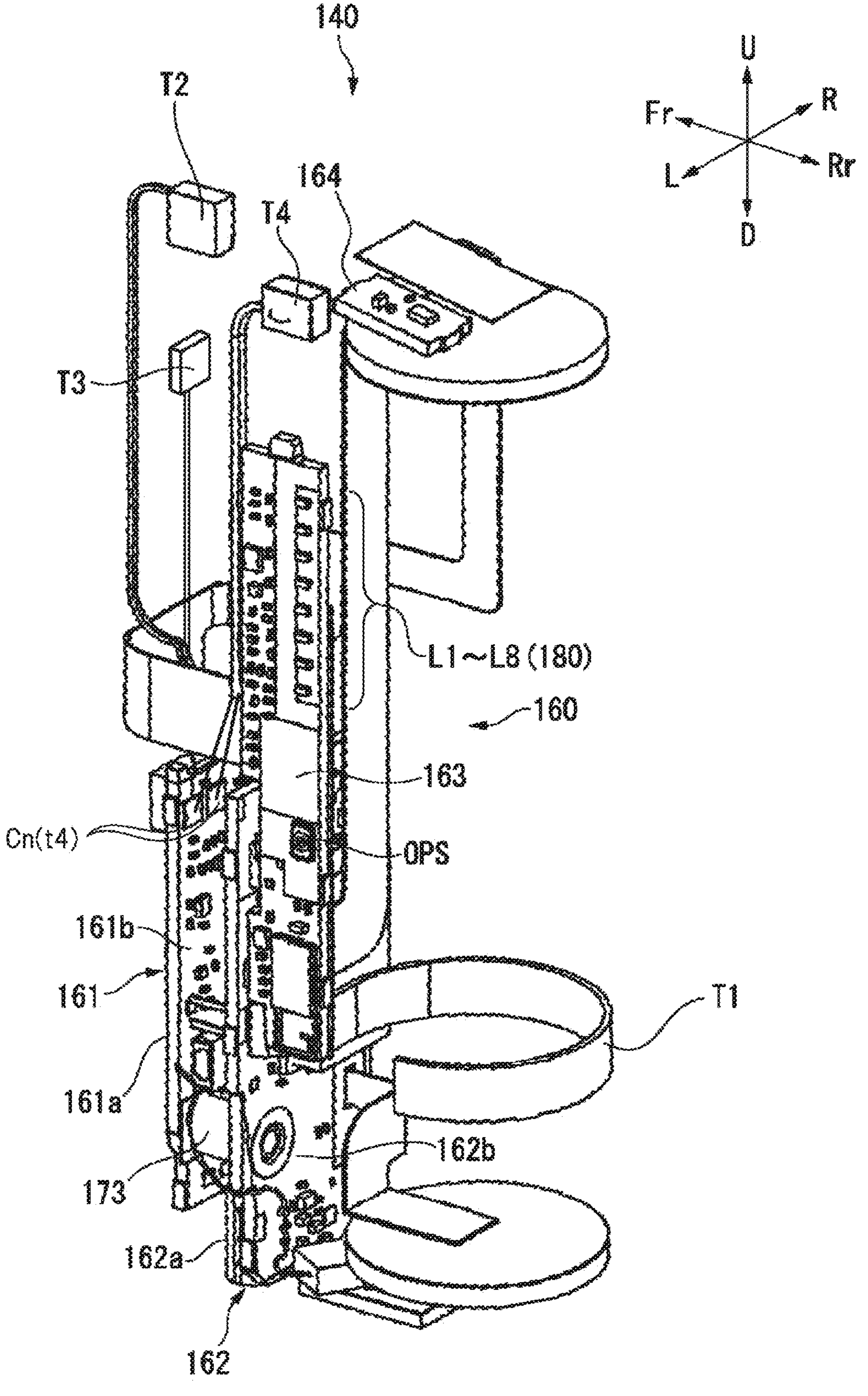
FIG. 7 is a perspective view of the internal unit with a power supply and a chassis removed.
Figure 8:
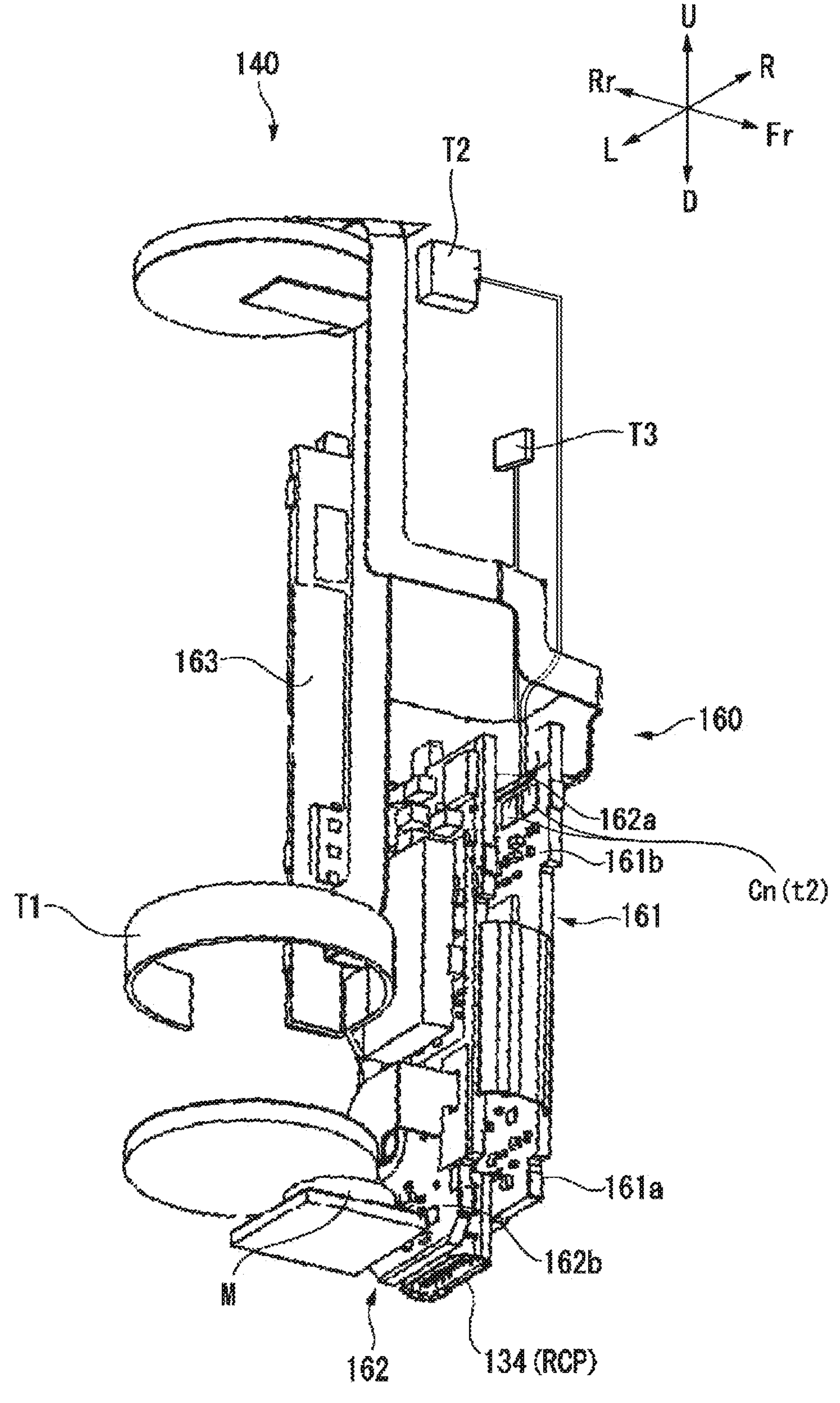
FIG. 8 is another perspective view of the internal unit with the power supply and the chassis removed.

FIG. 5 is a perspective view of the internal unit 140 of the inhaler 100. FIG. 6 is an exploded perspective view of the internal unit 140 of FIG. 5. FIG. 7 is a perspective view of the internal unit 140 from which a power supply BAT and the chassis 150 are removed. FIG. 8 is another perspective view of the internal unit 140 from which the power supply BAT and the chassis 150 are removed.

The internal unit 140 accommodated in an internal space of the case 110 includes the chassis 150, the power supply BAT, a circuit unit 160, a heating unit 170, a notification unit 180, and various sensors.

The chassis 150 includes a plate-shaped chassis body 151 that is arranged substantially in the center of the internal space of the case 110 in the front-rear direction and extends in the up-down direction and the front-rear direction, a plate-shaped front-rear dividing wall 152 that is arranged substantially in the center of the internal space of the case 110 in the front-rear direction and extends in the up-down direction and the left-right direction, a plate-shaped up-down dividing wall 153 that extends forward from substantially the center of the front-rear dividing wall 152 in the up-down direction, a plate-shaped chassis upper wall 154 that extends rearward from upper edges of the front-rear dividing wall 152 and the chassis body 151, and a plate-shaped chassis lower wall 155 that extends rearward from lower edges of the front-rear dividing wall 152 and the chassis body 151. A left surface of the chassis body 151 is covered with the inner panel 118 and the outer panel 115 of the case 110.

In the internal space of the case 110, by the chassis 150, a heating unit accommodating region 142 is defined and formed in a front upper portion, a substrate accommodating region 144 is defined and formed in a front lower portion, and a power supply accommodating space 146 is defined and formed in the rear in the up-down direction.

The heating unit 170 accommodated in the heating unit accommodating region 142 is constituted by a plurality of cylindrical members, and the cylindrical members are concentrically arranged to form a cylindrical body as a whole. The heating unit 170 includes a rod accommodating portion 172 capable of accommodating a part of the rod 500 therein, and a heater HTR (see FIGS. 10 to 19) that heats the rod 500 from an outer periphery or a center. It is preferable that a surface of the rod accommodating portion 172 and the heater HTR are thermally insulated by forming the rod accommodating portion 172 with a heat insulating material or providing a heat insulating material inside the rod accommodating portion 172. The heater HTR may be an element capable of heating the rod 500. The heater HTR is, for example, a heating element. Examples of the heating element include a heating resistor, a ceramic heater, and an induction heating heater. As the heater HTR, for example, a heater having a positive temperature coefficient (PTC) characteristic in which a resistance value increases with an increase in temperature is preferably used. Alternatively, a heater HTR having a negative temperature coefficient (NTC) characteristic in which a resistance value decreases with an increase in temperature may be used. The heating unit 170 has a function of defining a flow path of air supplied to the rod 500 and a function of heating the rod 500. The case 110 is formed with a vent (not shown) for introducing air, and is configured to allow air to enter the heating unit 170.

The power supply BAT accommodated in the power supply accommodating space 146 is a rechargeable secondary battery, an electric double layer capacitor, or the like, and is preferably a lithium ion secondary battery. An electrolyte of the power supply BAT may be constituted by one or a combination of a gel electrolyte, an electrolytic solution, a solid electrolyte, and an ionic liquid.

The notification unit 180 notifies various kinds of information such as SOC indicating a state of charge of the power supply BAT, a preheating time at the time of inhalation, and an inhalation available period. The notification unit 180 of the present embodiment includes eight LEDs L1 to L8 and a vibration motor M. The notification unit 180 may be configured by a light emitting element such as the LEDs L1 to L8, a vibration element such as the vibration motor M, or a sound output element. The notification unit 180 may be a combination of two or more elements among a light emitting element, a vibration element, and a sound output element.

The various sensors include an intake sensor that detects a puff operation (inhalation operation) of the user, a power supply temperature sensor that detects a temperature of the power supply BAT, a heater temperature sensor that detects a temperature of the heater HTR, a case temperature sensor that detects a temperature of the case 110, a cover position sensor that detects a position of the slider 119, a panel detection sensor that detects attachment and detachment of the outer panel 115, and the like.

The intake sensor mainly includes, for example, a thermistor T2 arranged near the opening 132. The power supply temperature sensor mainly includes, for example, a thermistor T1 arranged near the power supply BAT. The heater temperature sensor mainly includes, for example, a thermistor T3 arranged near the heater HTR. As described above, the rod accommodating portion 172 is preferably thermally insulated from the heater HTR. In this case, the thermistor T3 is preferably in contact with or close to the heater HTR inside the rod accommodating portion 172. When the heater HTR has the PTC characteristic or the NTC characteristic, the heater HTR itself may be used for the heater temperature sensor. The case temperature sensor mainly includes, for example, a thermistor T4 arranged near a left surface of the case 110. The cover position sensor mainly includes a Hall IC 14 including a Hall element arranged near the slider 119. The panel detection sensor mainly includes a Hall IC 13 including a Hall element arranged near an inner surface of the inner panel 118.

The circuit unit 160 includes four circuit boards, a plurality of integrated circuits (ICs), and a plurality of elements. The four circuit boards include a microcontroller unit (MCU)-mounted substrate 161 on which an MCU 1 and a charging IC 2 to be described later are mainly arranged, a receptacle-mounted substrate 162 on which a charging terminal 134 is mainly arranged, an LED-mounted substrate 163 on which an operation switch OPS, LEDs L1 to L8, and a communication IC 15 to be described later are arranged, and a Hall IC-mounted substrate 164 on which a Hall IC 14 to be described later including a Hall element constituting a cover position sensor is arranged.

The MCU-mounted substrate 161 and the receptacle-mounted substrate 162 are arranged parallel to each other in the substrate accommodating region 144. Specifically, the MCU-mounted substrate 161 and the receptacle-mounted substrate 162 are arranged such that element arrangement surfaces thereof are arranged along the left-right direction and the up-down direction, and the MCU-mounted substrate 161 is arranged in front of the receptacle-mounted substrate 162. The MCU-mounted substrate 161 and the receptacle-mounted substrate 162 each are provided with an opening. The MCU-mounted substrate 161 and the receptacle-mounted substrate 162 are fastened to a substrate fixing portion 156 of the front-rear dividing wall 152 by a bolt 136 in a state in which a cylindrical spacer 173 is interposed between peripheral edges of these openings. That is, the spacer 173 fixes positions of the MCU-mounted substrate 161 and the receptacle-mounted substrate 162 inside the case 110, and mechanically connects the MCU-mounted substrate 161 and the receptacle-mounted substrate 162. Accordingly, it is possible to prevent the MCU-mounted substrate 161 and the receptacle-mounted substrate 162 from coming into contact with each other and generating a short-circuit current therebetween.

For convenience, assuming that surfaces of the MCU-mounted substrate 161 and the receptacle-mounted substrate 162 facing the front are main surfaces 161*a* and 162*a*, respectively, and surfaces opposite to the main surfaces 161*a* and 162*a* are sub surfaces 161*b* and 162*b*, respectively, the sub surface 161*b* of the MCU-mounted substrate 161 and the main surface 162*a* of the receptacle-mounted substrate 162 face each other with a predetermined gap therebetween. The main surface 161*a* of the MCU-mounted substrate 161 faces a front surface of the case 110, and the sub surface 162*b* of the receptacle-mounted substrate 162 faces the front-rear dividing wall 152 of the chassis 150. Elements and ICs mounted on the MCU-mounted substrate 161 and the receptacle-mounted substrate 162 will be described later.

The LED-mounted substrate 163 is arranged on a left side surface of the chassis body 151 and between two magnets 124 arranged vertically. An element arrangement surface of the LED-mounted substrate 163 is arranged along the up-down direction and the front-rear direction. In other words, the element arrangement surfaces of the MCU-mounted substrate 161 and the receptacle-mounted substrate 162 are orthogonal to the element arrangement surface of the LED-mounted substrate 163. As described above, the element arrangement surfaces of the MCU-mounted substrate 161 and the receptacle-mounted substrate 162 and the element arrangement surface of the LED-mounted substrate 163 are not limited to being orthogonal to each other, and preferably intersect with each other (are not parallel to each other). The vibration motor M constituting the notification unit 180 together with the LEDs L1 to L8 is fixed to a lower surface of the chassis lower wall 155 and is electrically connected to the MCU-mounted substrate 161.

The Hall IC-mounted substrate 164 is arranged on an upper surface of the chassis upper wall 154.

<Operation Mode of Inhaler>

Figure 9:
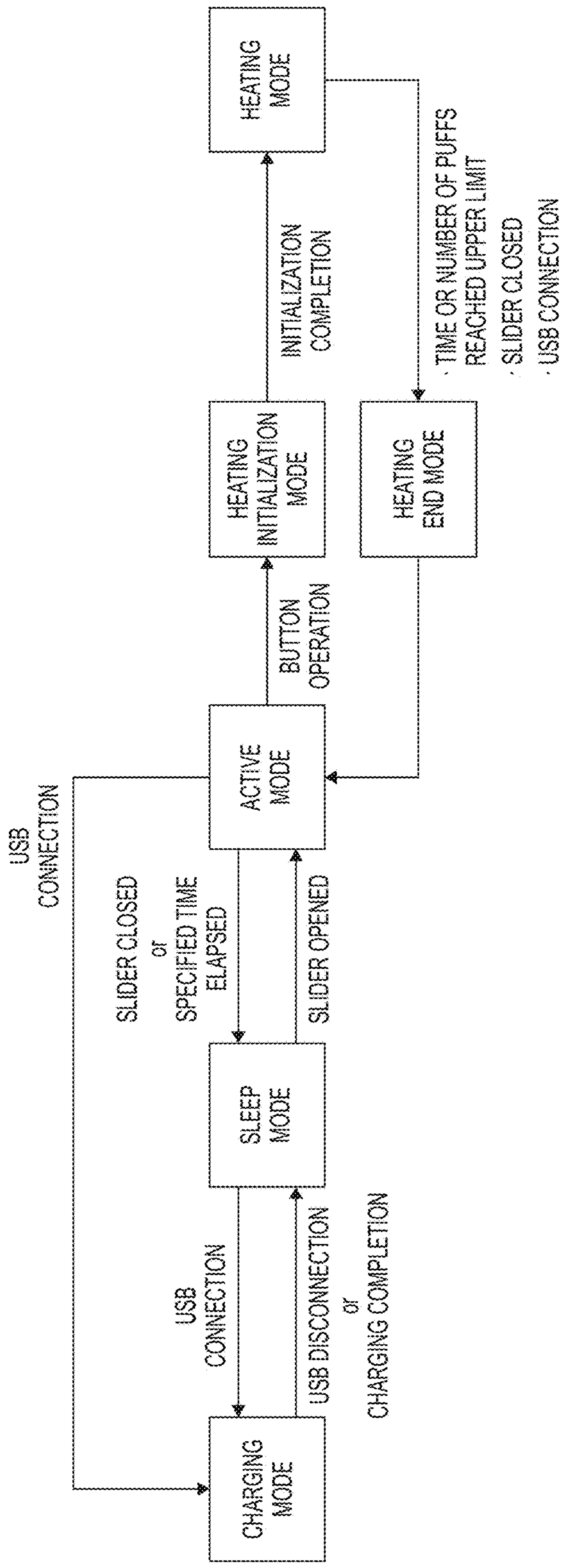
FIG. 9 is a schematic diagram for explaining an operation mode of an inhaler.

FIG. 9 is a schematic diagram for explaining an operation mode of the inhaler 100. As shown in FIG. 9, the operation mode of the inhaler 100 includes a charging mode, a sleep mode, an active mode, a heating initialization mode, a heating mode, and a heating end mode.

The sleep mode is a mode in which power supply to electronic components mainly required for heating control of the heater HTR is stopped to save power.

The active mode is a mode in which most functions except the heating control of the heater HTR are enabled. When the slider 119 is opened in a state of operating in the sleep mode, the inhaler 100 switches the operation mode to the active mode. When the slider 119 is closed or a non-operation time of the operation switch OPS reaches a predetermined time in a state of operating in the active mode, the inhaler 100 switches the operation mode to the sleep mode.

The heating initialization mode is a mode for initializing control parameters and the like for starting the heating control of the heater HTR. When the operation of the operation switch OPS is detected in a state of operating in the active mode, the inhaler 100 switches the operation mode to the heating initialization mode. When the initialization is completed, the inhaler 100 switches the operation mode to the heating mode.

The heating mode is a mode for executing heating control of the heater HTR (heating control for aerosol generation and heating control for temperature detection). When the operation mode is switched to the heating mode, the inhaler 100 starts the heating control of the heater HTR.

The heating end mode is a mode for executing end processing (storage processing of a heating history or the like) of the heating control of the heater HTR. In a state of operating in the heating mode, when an energization time to the heater HTR or the number of times of inhalation by the user reaches an upper limit or the slider 119 is closed, the inhaler 100 switches the operation mode to the heating end mode. When the end processing is completed, the inhaler 100 switches the operation mode to the active mode. When a USB connection is established in a state of operating in the heating mode, the inhaler 100 switches the operation mode to the heating end mode. When the end processing is completed, the inhaler 100 switches the operation mode to the active mode. As shown in FIG. 9, in this case, the operation mode may be switched to the active mode before the operation mode is switched to the charging mode. In other words, when the USB connection is established in a state of operating in the heating mode, the inhaler 100 may switch the operation mode in order of the heating end mode, the active mode, and the charging mode.

The charging mode is a mode in which the power supply BAT is charged by electric power supplied from an external power supply connected to the receptacle RCP. When the external power supply is connected to the receptacle RCP (USB connection) in a state of operating in the sleep mode or the active mode, the inhaler 100 switches the operation mode to the charging mode. When the charging of the power supply BAT is completed or the connection between the receptacle RCP and the external power supply is released in a state of operating in the charging mode, the inhaler 100 switches the operation mode to the sleep mode.

<Outline of Circuit of Internal Unit>

Figure 10:
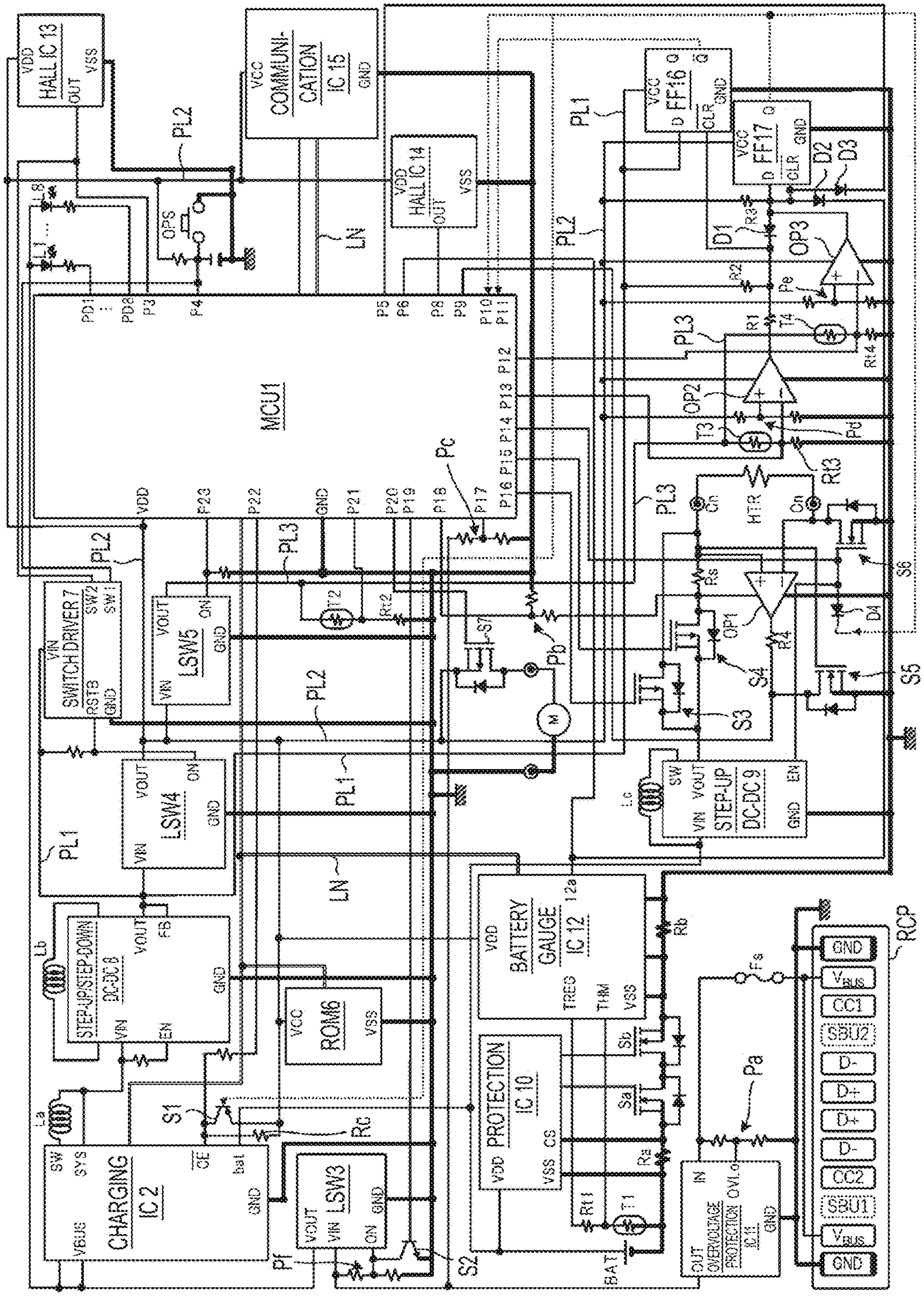
FIG. 10 shows a schematic configuration of an electric circuit of the internal unit.
Figure 11:
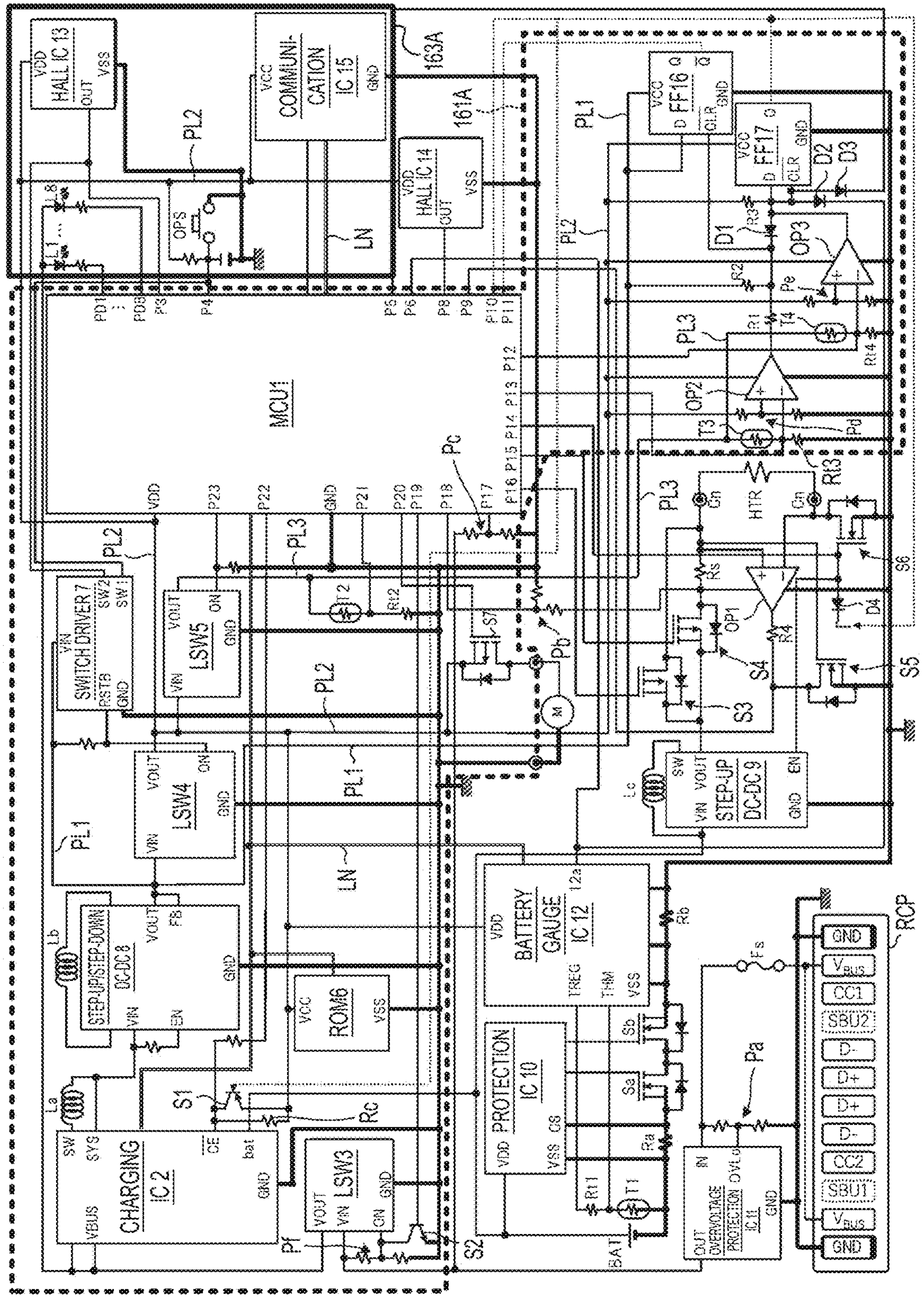
FIG. 11 shows a schematic configuration of the electric circuit of the internal unit.
Figure 12:
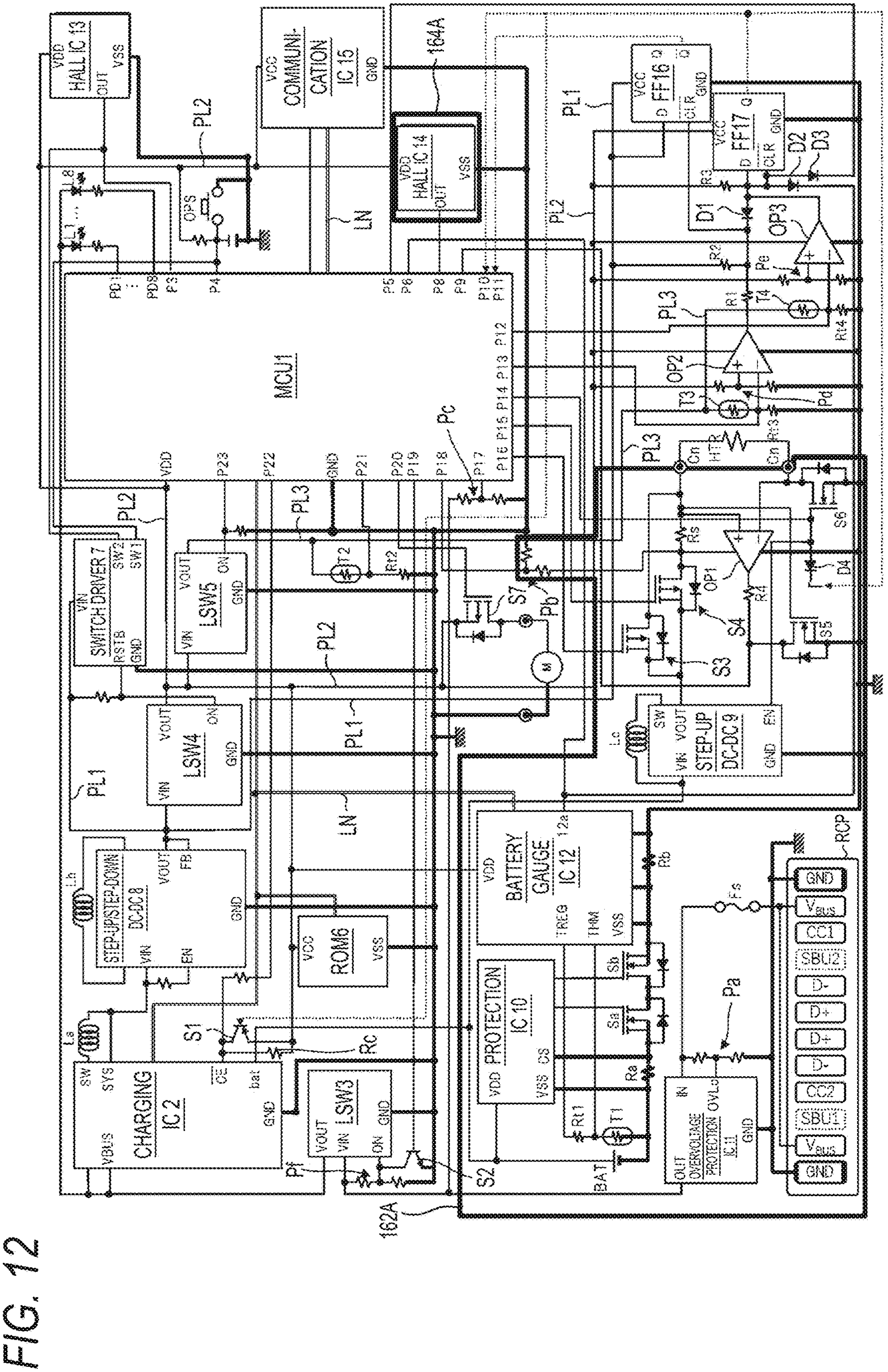
FIG. 12 shows a schematic configuration of the electric circuit of the internal unit.

FIGS. 10, 11, and 12 show a schematic configuration of an electric circuit of the internal unit 140. FIG. 11 is the same as FIG. 10 except that a range 161A (range surrounded by a thick broken line) mounted on the MCU-mounted substrate 161 and a range 163A (range surrounded by a thick solid line) mounted on the LED-mounted substrate 163 are added in an electric circuit shown in FIG. 10. FIG. 12 is the same as FIG. 10 except that a range 162A mounted on the receptacle-mounted substrate 162 and a range 164A mounted on the Hall IC-mounted substrate 164 are added in the electric circuit shown in FIG. 10.

A wiring indicated by a thick solid line in FIG. 10 is a wiring (wiring connected to a ground provided in the internal unit 140) having the same potential as a reference potential (ground potential) of the internal unit 140, and the wiring is hereinafter referred to as a ground line. In FIG. 10, an electronic component in which a plurality of circuit elements are formed into a chip is indicated by a rectangle, and the reference numerals of various terminals are described inside the rectangle. A power supply terminal VCC and a power supply terminal VDD mounted on the chip indicate power supply terminals on a high potential side. A power supply terminal VSS and a ground terminal GND mounted on the chip are power supply terminals on a low potential side (reference potential side). In the chipped electronic component, a difference between the potential of the power supply terminal on the high potential side and the potential of the power supply terminal on the low potential side becomes a power supply voltage. The chipped electronic component executes various functions using the power supply voltage.

As shown in FIG. 11, the MCU-mounted substrate 161 (range 161A) is provided with, as main electronic components, an MCU 1 that performs overall control of the inhaler 100, a charging IC 2 that performs charging control of the power supply BAT, load switches (hereinafter, LSW) 3, 4, and 5 configured by combining a capacitor, a resistor, a transistor, and the like, a read only memory (ROM) 6, a switch driver 7, a step-up/step-down DC-DC converter 8 (shown as step-up/step-down DC-DC 8 in the figure), an operational amplifier OP2, an operational amplifier OP3, flip-flops (hereinafter, FF) 16 and 17, a connector Cn (t2) electrically connected to the thermistor T2 configuring the intake sensor (the figure shows the thermistor T2 connected to the connector), a connector Cn (t3) electrically connected to the thermistor T3 configuring the heater temperature sensor (the figure shows the thermistor T3 connected to the connector), a connector Cn (t4) electrically connected to the thermistor T4 configuring the case temperature sensor (the figure shows the thermistor T4 connected to the connector), and a voltage divider Pc for USB connection detection.

The ground terminal GND of each of the charging IC 2, LSW 3, LSW 4, LSW 5, the switch driver 7, the step-up/step-down DC-DC converter 8, the FF 16, and the FF 17 is connected to the ground line. The power supply terminal VSS of the ROM 6 is connected to the ground line. Negative power supply terminals of the operational amplifiers OP2 and OP3 are connected to the ground line.

As shown in FIG. 11, the LED-mounted substrate 163 (range 163A) is provided with, as main electronic components, the Hall IC 13 including the Hall element constituting the panel detection sensor, the LEDs L1 to L8, the operation switch OPS, and the communication IC 15. The communication IC 15 is a communication module for communicating with an electronic device such as a smartphone. Each of the power supply terminal VSS of the Hall IC 13 and the ground terminal GND of the communication IC 15 is connected to the ground line. The communication IC 15 and the MCU 1 can communicate with each other via a communication line LN. One end of the operation switch OPS is connected to the ground line, and the other end of the operation switch OPS is connected to a terminal P4 of the MCU 1.

As shown in FIG. 12, the receptacle-mounted substrate 162 (range 162A) is provided with, as main electronic components, a power supply connector electrically connected to the power supply BAT (the figure shows the power supply BAT connected to the power supply connector), a connector electrically connected to the thermistor T1 constituting the power supply temperature sensor (the figure shows the thermistor T1 connected to the connector), a step-up DC-DC converter 9 (shown as step-up DC-DC 9 in the figure), a protection IC 10, an overvoltage protection IC 11, the battery gauge IC 12, a receptacle RCP, switches S3 to S6 composed of a MOSFET, an operational amplifier OP1, and a pair of (positive electrode side and negative electrode side) heater connectors Cn electrically connected to the heater HTR.

Two ground terminals GND of the receptacle RCP, a ground terminal GND of the step-up DC-DC converter 9, a power supply terminal VSS of the protection IC 10, a power supply terminal VSS of the battery gauge IC 12, a ground terminal GND of the overvoltage protection IC 11, and a negative power supply terminal of the operational amplifier OP1 are connected to the ground line.

As shown in FIG. 12, the Hall IC-mounted substrate 164 (range 164A) is provided with the Hall IC 14 including the Hall element constituting the cover position sensor. A power supply terminal VSS of the Hall IC 14 is connected to the ground line. An output terminal OUT of the Hall IC 14 is connected to a terminal P8 of the MCU 1. The MCU 1 detects the opening and closing of the slider 119 based on a signal input to the terminal P8.

As shown in FIG. 11, the connector electrically connected to the vibration motor M is provided on the MCU-mounted substrate 161.

<Details of Circuit of Internal Unit>

A connection relationship between the electronic components will be described below with reference to FIG. 10.

Two power supply input terminals $V_{BUS}$ of the receptacle RCP are each connected to an input terminal IN of the overvoltage protection IC 11 via a fuse $F_S$. When a USB plug is connected to the receptacle RCP and a USB cable including the USB plug is connected to an external power supply, a USB voltage $V_{USB}$ is supplied to the two power supply input terminals $V_{BUS}$ of the receptacle RCP.

One end of a voltage divider Pa including a series circuit of two resistors is connected to an input terminal IN of the overvoltage protection IC 11. The other end of the voltage divider Pa is connected to the ground line. A connection point of the two resistors constituting the voltage divider Pa is connected to a voltage detection terminal OVLo of the overvoltage protection IC 11. In a state in which a voltage input to the voltage detection terminal OVLo is less than a threshold value, the overvoltage protection IC 11 outputs a voltage input to the input terminal IN from the output terminal OUT. When the voltage input to the voltage detection terminal OVLo is equal to or higher than a threshold value (overvoltage), the overvoltage protection IC 11 stops the voltage output from the output terminal OUT (cuts off the electrical connection between the LSW 3 and the receptacle RCP) to protect electronic components downstream of the overvoltage protection IC 11. An output terminal OUT of the overvoltage protection IC 11 is connected to an input terminal VIN of the LSW 3 and one end of the voltage divider Pc (series circuit of two resistors) connected to the MCU 1. The other end of the voltage divider Pc is connected to the ground line. A connection point of the two resistors constituting the voltage divider Pc is connected to a terminal P17 of the MCU 1.

One end of a voltage divider Pf including a series circuit of two resistors is connected to an input terminal VIN of the LSW 3. The other end of the voltage divider Pf is connected to the ground line. A connection point of the two resistors constituting the voltage divider Pf is connected to a control terminal ON of the LSW 3. A collector terminal of a bipolar transistor S2 is connected to the control terminal ON of the LSW 3. An emitter terminal of the bipolar transistor S2 is connected to the ground line. A base terminal of the bipolar transistor S2 is connected to a terminal P19 of the MCU 1. When a signal input to the control terminal ON becomes high level, the LSW 3 outputs the voltage input to the input terminal VIN from an output terminal VOUT. The output terminal VOUT of the LSW 3 is connected to an input terminal VBUS of the charging IC 2. The MCU 1 turns on the bipolar transistor S2 while the USB connection is not established. Accordingly, since the control terminal ON of the LSW 3 is connected to the ground line via the bipolar transistor S2, a low-level signal is input to the control terminal ON of the LSW 3.

The bipolar transistor S2 connected to the LSW 3 is turned off by the MCU 1 when the USB connection is established. When the bipolar transistor S2 is turned off, the USB voltage $V_{USB}$ divided by the voltage divider Pf is input to the control terminal ON of the LSW 3. Therefore, when the USB connection is established and the bipolar transistor S2 is turned off, a high-level signal is input to the control terminal ON of the LSW 3. Accordingly, the LSW 3 outputs the USB voltage $V_{USB}$ supplied from the USB cable from the output terminal VOUT. Even if the USB connection is established in a state in which the bipolar transistor S2 is not turned off, the control terminal ON of the LSW 3 is connected to the ground line via the bipolar transistor S2. Therefore, it should be noted that a low-level signal continues to be input to the control terminal ON of the LSW 3 unless the MCU 1 turns off the bipolar transistor S2.

A positive electrode terminal of the power supply BAT is connected to a power supply terminal VDD of the protection IC 10, an input terminal VIN of the step-up DC-DC converter 9, and a charging terminal bat of the charging IC 2.

Therefore, a power supply voltage $V_{BAT}$ of the power supply BAT is supplied to the protection IC 10, the charging IC 2, and the step-up DC-DC converter 9. A resistor Ra, a switch Sa composed of a MOSFET, a switch Sb composed of a MOSFET, and a resistor Rb are connected in series to a negative terminal of the power supply BAT in this order. A current detection terminal CS of the protection IC 10 is connected to a connection point between the resistor Ra and the switch Sa. Control terminals of the switch Sa and the switch Sb are connected to the protection IC 10. Both ends of the resistor Rb are connected to the battery gauge IC 12.

The protection IC 10 acquires a value of a current flowing through the resistor Ra during charging and discharging of the power supply BAT from the voltage input to the current detection terminal CS. When the current value becomes excessive (overcurrent), the protection IC 10 performs opening and closing control of the switch Sa and the switch Sb to stop charging or discharging of the power supply BAT, thereby protecting the power supply BAT. More specifically, in a case where the protection IC 10 acquires an excessive current value during charging of the power supply BAT, the protection IC 10 turns off the switch Sb to stop the charging of the power supply BAT. In a case where the protection IC 10 acquires an excessive current value during discharging of the power supply BAT, the protection IC 10 turns off the switch Sa to stop the discharging of the power supply BAT. Further, in a case where the voltage value of the power supply BAT becomes abnormal from the voltage input to the power supply terminal VDD (in a case of overcharge or overvoltage), the protection IC 10 performs opening and closing control of the switch Sa and the switch Sb to stop charging or discharging of the power supply BAT, thereby protecting the power supply BAT. More specifically, in a case where the overcharge of the power supply BAT is detected, the protection IC 10 turns off the switch Sb to stop the charging of the power supply BAT. In a case where the overdischarge of the power supply BAT is detected, the protection IC 10 turns off the switch Sa to stop the discharge of the power supply BAT.

A resistor Rt1 is connected to the connector connected to the thermistor T1 arranged near the power supply BAT. A series circuit of the resistor Rt1 and the thermistor T1 is connected to the ground line and a regulator terminal TREG of the battery gauge IC 12. A connection point between the thermistor T1 and the resistor Rt1 is connected to a thermistor terminal THM of the battery gauge IC 12. The thermistor T1 may be a positive temperature coefficient (PTC) thermistor whose resistance value increases as the temperature increases, or may be a negative temperature coefficient (NTC) thermistor whose resistance value decreases as the temperature increases.

The battery gauge IC 12 detects a current flowing through the resistor Rb, and derives battery information such as a remaining capacity of the power supply BAT, SOC indicating a state of charge, and SOH indicating a state of health based on the detected current value. The battery gauge IC 12 supplies a voltage from a built-in regulator connected to the regulator terminal TREG to a voltage divider of the thermistor T1 and the resistor Rt1. The battery gauge IC 12 acquires a voltage divided by the voltage divider from the thermistor terminal THM, and acquires temperature information on the temperature of the power supply BAT based on the voltage. The battery gauge IC 12 is connected to the MCU 1 via a communication line LN for serial communication, and is configured to communicate with the MCU 1. The battery gauge IC 12 transmits the derived battery information and the acquired temperature information of the power supply BAT to the MCU 1 in response to a request from the MCU 1. To perform serial communication, a plurality of signal lines such as a data line for data transmission and a clock line for synchronization are required. It should be noted that only one signal line is shown in FIGS. 10 to 19 for simplification.

The battery gauge IC 12 includes a notification terminal 12*a*. The notification terminal 12*a* is connected to a terminal P6 of the MCU 1 and a cathode of a diode D2 to be described later. When an abnormality such as an excessive temperature of the power supply BAT is detected, the battery gauge IC 12 outputs a low-level signal from the notification terminal 12*a* to notify the MCU 1 of the occurrence of the abnormality. The low-level signal is also input to a CLR (−) terminal of the FF 17 via the diode D2.

One end of a reactor Lc is connected to a switching terminal SW of the step-up DC-DC converter 9. The other end of the reactor Lc is connected to the input terminal VIN of the step-up DC-DC converter 9. The step-up DC-DC converter 9 steps up an input voltage by performing on/off control of a built-in transistor connected to the switching terminal SW, and outputs the step-up voltage from an output terminal VOUT. The input terminal VIN of the step-up DC-DC converter 9 constitutes a power supply terminal on the high potential side of the step-up DC-DC converter 9. The step-up DC-DC converter 9 performs a step-up operation when a signal input to an enable terminal EN is at a high level. In a case of the USB connection, the signal input to the enable terminal EN of the step-up DC-DC converter 9 may be controlled to a low level by the MCU 1. Alternatively, in the state of the USB connection, the MCU 1 may not control the signal input to the enable terminal EN of the step-up DC-DC converter 9 to make a potential of the enable terminal EN unstable.

A source terminal of a switch S4 constituted by a P-channel MOSFET is connected to the output terminal VOUT of the step-up DC-DC converter 9. A gate terminal of the switch S4 is connected to a terminal P15 of the MCU 1. One end of a resistor Rs is connected to a drain terminal of the switch S4. The other end of the resistor Rs is connected to a heater connector Cn on the positive electrode side connected to one end of the heater HTR. A voltage divider Pb including two resistors is connected to a connection point between the switch S4 and the resistor Rs. A connection point of the two resistors constituting the voltage divider Pb is connected to a terminal P18 of the MCU 1. A connection point between the switch S4 and the resistor Rs is further connected to a positive power supply terminal of the operational amplifier OP1.

A source terminal of the switch S3 constituted by a P-channel MOSFET is connected to a connection line between the output terminal VOUT of the step-up DC-DC converter 9 and the source terminal of the switch S4. A gate terminal of the switch S3 is connected to a terminal P16 of the MCU 1. A drain terminal of the switch S3 is connected to a connection line between the resistor Rs and the heater connector Cn on the positive electrode side. Thus, a circuit including the switch S3 and a circuit including the switch S4 and the resistor Rs are connected in parallel between the output terminal VOUT of the step-up DC-DC converter 9 and the positive electrode side of the heater connector Cn. Since the circuit including the switch S3 does not include a resistor, a resistance of the circuit including the switch S3 is lower than that of the circuit including the switch S4 and the resistor Rs.

A non-inverting input terminal of the operational amplifier OP1 is connected to the connection line between the resistor Rs and the heater connector Cn on the positive electrode side. An inverting input terminal of the operational amplifier OP1 is connected to a heater connector Cn on the negative electrode side connected to the other end of the heater HTR and a drain terminal of the switch S6 configured by an N-channel MOSFET. A source terminal of the switch S6 is connected to the ground line. A gate terminal of the switch S6 is connected to a terminal P14 of the MCU 1, an anode of a diode D4, and the enable terminal EN of the step-up DC-DC converter 9. A cathode of the diode D4 is connected to a Q terminal of the FF 17. One end of a resistor R4 is connected to an output terminal of the operational amplifier OP1. The other end of the resistor R4 is connected to a terminal P9 of the MCU 1 and a drain terminal of a switch S5 configured by an N-channel MOSFET. A source terminal of the switch S5 is connected to the ground line. A gate terminal of the switch S5 is connected to the connection line between the resistor Rs and the heater connector Cn on the positive electrode side.

The input terminal VBUS of the charging IC 2 is connected to an anode of each of the LEDs L1 to L8. The cathodes of the LEDs L1 to L8 are connected to control terminals PD1 to PD8 of the MCU 1 via resistors for current limitation. That is, the LEDs L1 to L8 are connected in parallel to the input terminal VBUS. The LEDs L1 to L8 are configured to be operable by a USB voltage $V_{USB}$ supplied from a USB cable connected to the receptacle RCP and a voltage supplied from the power supply BAT via the charging IC 2. The MCU 1 incorporates transistors (switching elements) connected to the control terminals PD1 to PD8 and the ground terminal GND. The MCU 1 turns on a transistor connected to the control terminal PD1 to energize the LED L1 to turn on the LED L1, and turns off the transistor connected to the control terminal PD1 to turn off the LED L1. By switching on and off of the transistor connected to the control terminal PD1 at high speed, the luminance and the light emission pattern of the LED L1 can be dynamically controlled. Lighting of LEDs L2 to L8 is similarly controlled by the MCU 1.

The charging IC 2 has a charging function of charging the power supply BAT based on the USB voltage $V_{USB}$ input to the input terminal VBUS. The charging IC 2 acquires a charging current or a charging voltage of the power supply BAT from a terminal or a wiring (not shown), and performs charging control of the power supply BAT (control of power supply from the charging terminal bat to the power supply BAT) based on the charging current or the charging voltage. Further, the charging IC 2 may acquire the temperature information of the power supply BAT transmitted from the battery gauge IC 12 to the MCU 1 from the MCU 1 through serial communication using the communication line LN and use the temperature information for charging control.

The charging IC 2 further includes a $V_{BAT}$ power path function and an OTG function. The $V_{BAT}$ power path function is a function of outputting, from an output terminal SYS, a system power supply voltage Vcc0 that substantially matches the power supply voltage $V_{BAT}$ input to the charging terminal bat. The OTG function is a function of outputting, from the input terminal VBUS, a system power supply voltage Vcc4 obtained by boosting the power supply voltage $V_{BAT}$ input to the charging terminal bat. ON/OFF of the OTG function of the charging IC 2 is controlled by the MCU 1 through the serial communication using the communication line LN. In the OTG function, the power supply voltage $V_{BAT}$ input to the charging terminal bat may be output as it is from the input terminal VBUS. In this case, the power supply voltage $V_{BAT}$ is substantially equal to the system power supply voltage Vcc4.

An output terminal SYS of the charging IC 2 is connected to an input terminal VIN of the step-up/step-down DC-DC converter 8. One end of a reactor La is connected to a switching terminal SW of the charging IC 2. The other end of the reactor La is connected to the output terminal SYS of the charging IC 2. A charge enable terminal CE (–) of the charge IC 2 is connected to a terminal P22 of the MCU 1 via a resistor. Further, a collector terminal of the bipolar transistor S1 is connected to the charge enable terminal CE (–) of the charge IC 2. An emitter terminal of the bipolar transistor S1 is connected to an output terminal VOUT of the LSW 4 to be described later. A base terminal of the bipolar transistor S1 is connected to the Q terminal of the FF 17. Further, one end of a resistor Rc is connected to the charge enable terminal CE (–) of the charging IC 2. The other end of the resistor Re is connected to the output terminal VOUT of the LSW 4.

A resistor is connected to an input terminal VIN and an enable terminal EN of the step-up/step-down DC-DC converter 8. By inputting the system power supply voltage Vcc0 from the output terminal SYS of the charging IC 2 to the input terminal VIN of the step-up/step-down DC-DC converter 8, a signal input to the enable terminal EN of the step-up/step-down DC-DC converter 8 becomes high level, and the step-up/step-down DC-DC converter 8 starts a step-up operation or a step-down operation. The step-up/step-down DC-DC converter 8 steps up or steps down the system power supply voltage Vcc0 input to the input terminal VIN by switching control of a built-in transistor connected to a reactor Lb to generate a system power supply voltage Vcc1, and outputs the system power supply voltage Vcc1 from an output terminal VOUT. The output terminal VOUT of the step-up/step-down DC-DC converter 8 is connected to a feedback terminal FB of the step-up/step-down DC-DC converter 8, the input terminal VIN of the LSW 4, an input terminal VIN of the switch driver 7, and a power supply terminal VCC and D terminal of the FF 16. A wiring to which the system power supply voltage Vcc1 output from the output terminal VOUT of the step-up/step-down DC-DC converter 8 is supplied is referred to as a power supply line PL1.

When a signal input to a control terminal ON becomes high level, the LSW 4 outputs the system power supply voltage Vcc1 input to the input terminal VIN from the output terminal VOUT. The control terminal ON of the LSW 4 and the power supply line PL1 are connected via a resistor. Therefore, when the system power supply voltage Vcc1 is supplied to the power supply line PL1, a high-level signal is input to the control terminal ON of the LSW 4. A voltage output from the LSW 4 is the same as the system power supply voltage Vcc1 if the wiring resistance or the like is ignored. However, to distinguish the voltage output from LSW 4 from the system power supply voltage Vcc1, the voltage output from the output terminal VOUT of the LSW 4 is hereinafter referred to as a system power supply voltage Vcc2.

The output terminal VOUT of the LSW 4 is connected to the power supply terminal VDD of the MCU 1, an input terminal VIN of the LSW 5, a power supply terminal VDD of the battery gauge IC 12, a power supply terminal VCC of the ROM 6, the emitter terminal of the bipolar transistor S1, the resistor Rc, and a power supply terminal VCC of the FF 17. A wiring to which the system power supply voltage Vcc2 output from the output terminal VOUT of the LSW 4 is supplied is referred to as a power supply line PL2.

When a signal input to a control terminal ON becomes high level, the LSW 5 outputs the system power supply voltage Vcc2 input to the input terminal VIN from the output terminal VOUT. A control terminal ON of the LSW 5 is connected to a terminal P23 of the MCU 1. A voltage output from the LSW 5 is the same as the system power supply voltage Vcc2 if the wiring resistance or the like is ignored. However, to distinguish the voltage output from LSW 5 from the system power supply voltage Vcc2, a voltage output from an output terminal VOUT of the LSW 5 is hereinafter referred to as a system power supply voltage Vcc3. A wiring to which the system power supply voltage Vcc3 output from the output terminal VOUT of the LSW 5 is supplied is referred to as a power supply line PL3.

A series circuit of the thermistor T2 and a resistor Rt2 is connected to the power supply line PL3, and the resistor Rt2 is connected to the ground line. The thermistor T2 and the resistor Rt2 constitute a voltage divider, and a connection point thereof is connected to a terminal P21 of the MCU 1. The MCU 1 detects a temperature variation (resistance value variation) of the thermistor T2 based on a voltage input to the terminal P21, and determines the presence or absence of the puff operation based on an amount of the temperature variation.

A series circuit of the thermistor T3 and a resistor Rt3 is connected to the power supply line PL3, and the resistor Rt3 is connected to the ground line. The thermistor T3 and the resistor Rt3 constitute a voltage divider, and a connection point thereof is connected to a terminal P13 of the MCU 1 and an inverting input terminal of the operational amplifier OP2. The MCU 1 detects the temperature of the thermistor T3 (corresponding to the temperature of the heater HTR) based on a voltage input to the terminal P13.

A series circuit of the thermistor T4 and a resistor Rt4 is connected to the power supply line PL3, and the resistor Rt4 is connected to the ground line. The thermistor T4 and the resistor Rt4 constitute a voltage divider, and a connection point thereof is connected to a terminal P12 of the MCU 1 and an inverting input terminal of the operational amplifier OP3. The MCU 1 detects the temperature of the thermistor T4 (corresponding to the temperature of the case 110) based on a voltage input to the terminal P12.

A source terminal of a switch S7 configured by a MOSFET is connected to the power supply line PL2. A gate terminal of the switch S7 is connected to a terminal P20 of the MCU 1. A drain terminal of the switch S7 is connected to one of a pair of connectors to which the vibration motor M is connected. The other one of the pair of connectors is connected to the ground line. The MCU 1 can control opening and closing of the switch S7 by operating a potential of the terminal P20 to vibrate the vibration motor M in a specific pattern. A dedicated driver IC may be used instead of the switch S7.

A positive power supply terminal of the operational amplifier OP2 and a voltage divider Pd (series circuit of two resistors) connected to a non-inverting input terminal of the operational amplifier OP2 are connected to the power supply line PL2. A connection point of the two resistors constituting the voltage divider Pd is connected to the non-inverting input terminal of the operational amplifier OP2. The operational amplifier OP2 outputs a signal corresponding to the temperature of the heater HTR (signal corresponding to a resistance value of the thermistor T3). In the present embodiment, since a thermistor having the NTC characteristic is used as the thermistor T3, an output voltage of the operational amplifier OP2 decreases as the temperature of the heater HTR (temperature of the thermistor T3) increases. This is because a negative power supply terminal of the operational amplifier OP2 is connected to the ground line, and when a voltage value (divided voltage value by the thermistor T3 and the resistor Rt3) input to the inverting input terminal of the operational amplifier OP2 becomes lager than a voltage value (divided voltage value by the voltage divider Pd) input to the non-inverting input terminal of the operational amplifier OP2, a value of the output voltage of the operational amplifier OP2 is substantially equal to a value of the ground potential. That is, when the temperature of the heater HTR (temperature of the thermistor T3) becomes high, the output voltage of the operational amplifier OP2 becomes low level.

When a thermistor having the PTC characteristic is used as the thermistor T3, the output of the voltage divider of the thermistor T3 and the resistor Rt3 may be connected to the non-inverting input terminal of the operational amplifier OP2, and the output of the voltage divider Pd may be connected to the inverting input terminal of the operational amplifier OP2.

A positive power supply terminal of the operational amplifier OP3 and a voltage divider Pe (series circuit of two resistors) connected to a non-inverting input terminal of the operational amplifier OP3 are connected to the power supply line PL2. A connection point of the two resistors constituting the voltage divider Pe is connected to the non-inverting input terminal of the operational amplifier OP3. The operational amplifier OP3 outputs a signal corresponding to the temperature of the case 110 (signal corresponding to a resistance value of the thermistor T4). In the present embodiment, since a thermistor having the NTC characteristic is used as the thermistor T4, an output voltage of the operational amplifier OP3 decreases as the temperature of the case 110 increases. This is because a negative power supply terminal of the operational amplifier OP3 is connected to the ground line, and when a voltage value (divided voltage value by the thermistor T4 and the resistor Rt4) input to the inverting input terminal of the operational amplifier OP3 becomes lager than a voltage value (divided voltage value by the voltage divider Pe) input to the non-inverting input terminal of the operational amplifier OP3, a value of the output voltage of the operational amplifier OP3 is substantially equal to a value of the ground potential. That is, when the temperature of the thermistor T4 becomes high, the output voltage of the operational amplifier OP3 becomes low level.

When a thermistor having the PTC characteristic is used as the thermistor T4, the output of the voltage divider of the thermistor T4 and the resistor Rt4 may be connected to the non-inverting input terminal of the operational amplifier OP3, and the output of the voltage divider Pe may be connected to the inverting input terminal of the operational amplifier OP3.

A resistor R1 is connected to the output terminal of the operational amplifier OP2. A cathode of a diode D1 is connected to the resistor R1. An anode of the diode D1 is connected to the output terminal of the operational amplifier OP3, a D terminal of the FF 17, and a CLR (−) terminal of the FF 17. A resistor R2 connected to the power supply line PL1 is connected to a connection line between the resistor R1 and the diode D1. A CLR (−) terminal of the FF 16 is connected to the connection line.

One end of a resistor R3 is connected to a connection line between a connection point of the anode of the diode D1 and the output terminal of the operational amplifier OP3 and the D terminal of the FF 17. The other end of the resistor R3 is connected to the power supply line PL2. Further, an anode of the diode D2 connected to the notification terminal 12*a* of the battery gauge IC 12, the anode of the diode D3, and the CLR (−) terminal of the FF 17 are connected to the connection line. A cathode of the diode D3 is connected to a terminal P5 of the MCU 1.

When the temperature of the heater HTR becomes excessive, a signal output from the operational amplifier OP2 becomes small, and a signal input to the CLR (−) terminal becomes low level, the FF 16 inputs a high-level signal from a Q (−) terminal to a terminal P11 of the MCU 1. The high-level system power supply voltage Vcc1 is supplied from the power supply line PL1 to the D terminal of the FF 16. Therefore, in the FF 16, a low-level signal is continuously output from the Q (−) terminal unless the signal input to the CLR (−) terminal operating with negative logic becomes low level.

The signal input to the CLR (−) terminal of the FF 17 becomes low level when the temperature of the heater HTR becomes excessive, when the temperature of the case 110 becomes excessive, or when a low-level signal indicating abnormality detection is output from the notification terminal 12*a* of the battery gauge IC 12. The FF 17 outputs a low-level signal from the Q terminal when the signal input to the CLR (−) terminal becomes low level. The low-level signal is input to a terminal P10 of the MCU 1, the gate terminal of the switch S6, the enable terminal EN of the step-up DC-DC converter 9, and the base terminal of the bipolar transistor S1 connected to the charging IC 2. When the low-level signal is input to the gate terminal of the switch S6, a gate-source voltage of the N-channel MOSFET constituting the switch S6 becomes lower than a threshold voltage, and thus the switch S6 is turned off. When the low-level signal is input to the enable terminal EN of the step-up DC-DC converter 9, the enable terminal EN of the step-up DC-DC converter 9 has a positive logic, and thus the step-up operation is stopped. When the low-level signal is input to the base terminal of the bipolar transistor S1, the bipolar transistor S1 is turned on (an amplified current is output from the collector terminal). When the bipolar transistor S1 is turned on, the high-level system power supply voltage Vcc2 is input to the CE (−) terminal of the charging IC 2 via the bipolar transistor S1. Since the CE (−) terminal of the charging IC 2 has a negative logic, the charging of the power supply BAT is stopped. Accordingly, the heating of the heater HTR and the charging of the power supply BAT are stopped. Even if the MCU 1 outputs a low-level enable signal from the terminal P22 to the charge enable terminal CE (−) of the charging IC 2, when the bipolar transistor S1 is turned on, the amplified current is input from the collector terminal to the terminal P22 of the MCU 1 and the charge enable terminal CE (−) of the charging IC 2. Accordingly, it should be noted that a high-level signal is input to the charge enable terminal CE (−) of the charge IC 2.

The high-level system power supply voltage Vcc2 is supplied from the power supply line PL2 to the D terminal of the FF 17. Therefore, in the FF 17, a high-level signal is continuously output from the Q terminal unless the signal input to the CLR (−) terminal operating with negative logic becomes low level. When the low-level signal is output from the output terminal of the operational amplifier OP3, the low-level signal is input to the CLR (−) terminal of the FF 17 regardless of the level of the signal output from the output terminal of the operational amplifier OP2. It should be noted that when the high-level signal is output from the output terminal of the operational amplifier OP2, the low-level signal output from the output terminal of the operational amplifier OP3 is not affected by the high-level signal due to the diode D1. When the low-level signal is output from the output terminal of the operational amplifier OP2, even if the high-level signal is output from the output terminal of the operational amplifier OP3, the high-level signal is replaced with the low-level signal via the diode D1.

The power supply line PL2 further branches from the MCU-mounted substrate 161 toward the LED-mounted substrate 163 and the Hall IC-mounted substrate 164. A power supply terminal VDD of the Hall IC 13, a power supply terminal VCC of the communication IC 15, and a power supply terminal VDD of the Hall IC 14 are connected to the branched power supply line PL2.

An output terminal OUT of the Hall IC 13 is connected to a terminal P3 of the MCU 1 and a terminal SW2 of the switch driver 7. When the outer panel 115 is detached, the low-level signal is output from the output terminal OUT of the Hall IC 13. The MCU 1 determines whether the outer panel 115 is attached based on a signal input to the terminal P3.

The LED-mounted substrate 163 is provided with a series circuit (a series circuit of a resistor and a capacitor) connected to the operation switch OPS. The series circuit is connected to the power supply line PL2. A connection point between the resistor and the capacitor of the series circuit is connected to a terminal P4 of the MCU 1, the operation switch OPS, and a terminal SW1 of the switch driver 7. In a state in which the operation switch OPS is not pressed, the operation switch OPS is not conducted, and signals input to the terminal P4 of the MCU 1 and the terminal SW1 of the switch driver 7 become high level due to the system power supply voltage Vcc2. When the operation switch OPS is pressed and the operation switch OPS is brought into a conductive state, the signals input to the terminal P4 of the MCU 1 and the terminal SW1 of the switch driver 7 become low level because the terminal P4 of the MCU 1 and the terminal SW1 of the switch driver 7 are connected to the ground line. The MCU 1 detects the operation of the operation switch OPS based on a signal input to the terminal P4.

The switch driver 7 is provided with a reset input terminal RSTB. The reset input terminal RSTB is connected to a control terminal ON of the LSW 4. In a case where both the levels of the signals input to the terminal SW1 and the terminal SW2 become the low level (a state in which the outer panel 115 is detached and the operation switch OPS is pressed), the switch driver 7 stops an output operation of the LSW 4 by outputting a low-level signal from the reset input terminal RSTB. That is, when the operation switch OPS, which is originally pressed down by the pressing portion 117 of the outer panel 115, is directly pressed down by the user in a state in which the outer panel 115 is detached, both the levels of the signals input to the terminal SW1 and the terminal SW2 of the switch driver 7 become the low level.

<Operation of Inhaler for Each Operation Mode>

Figure 13:
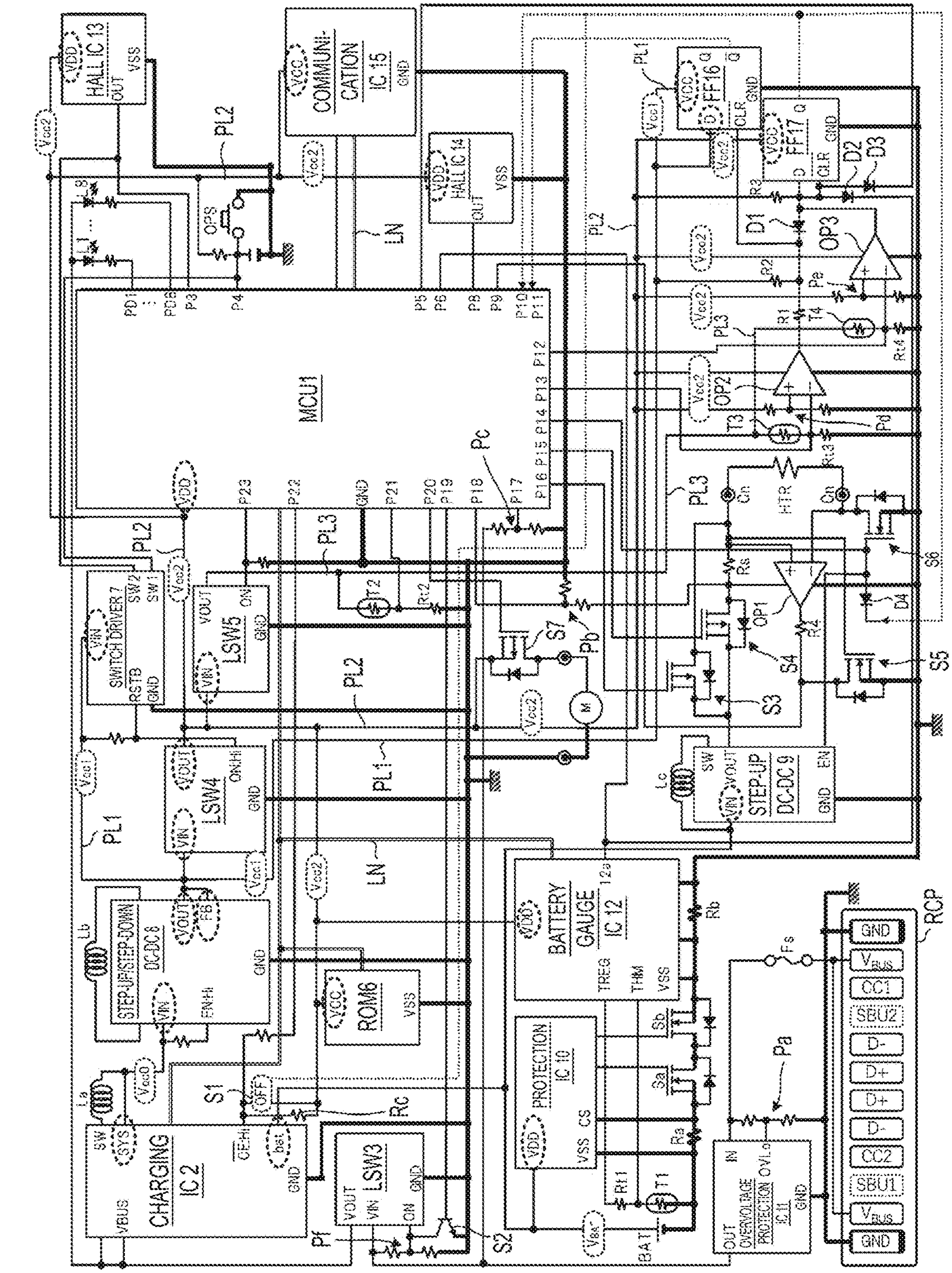
FIG. 13 is a diagram for explaining an operation of the electric circuit in a sleep mode.
Figure 14:
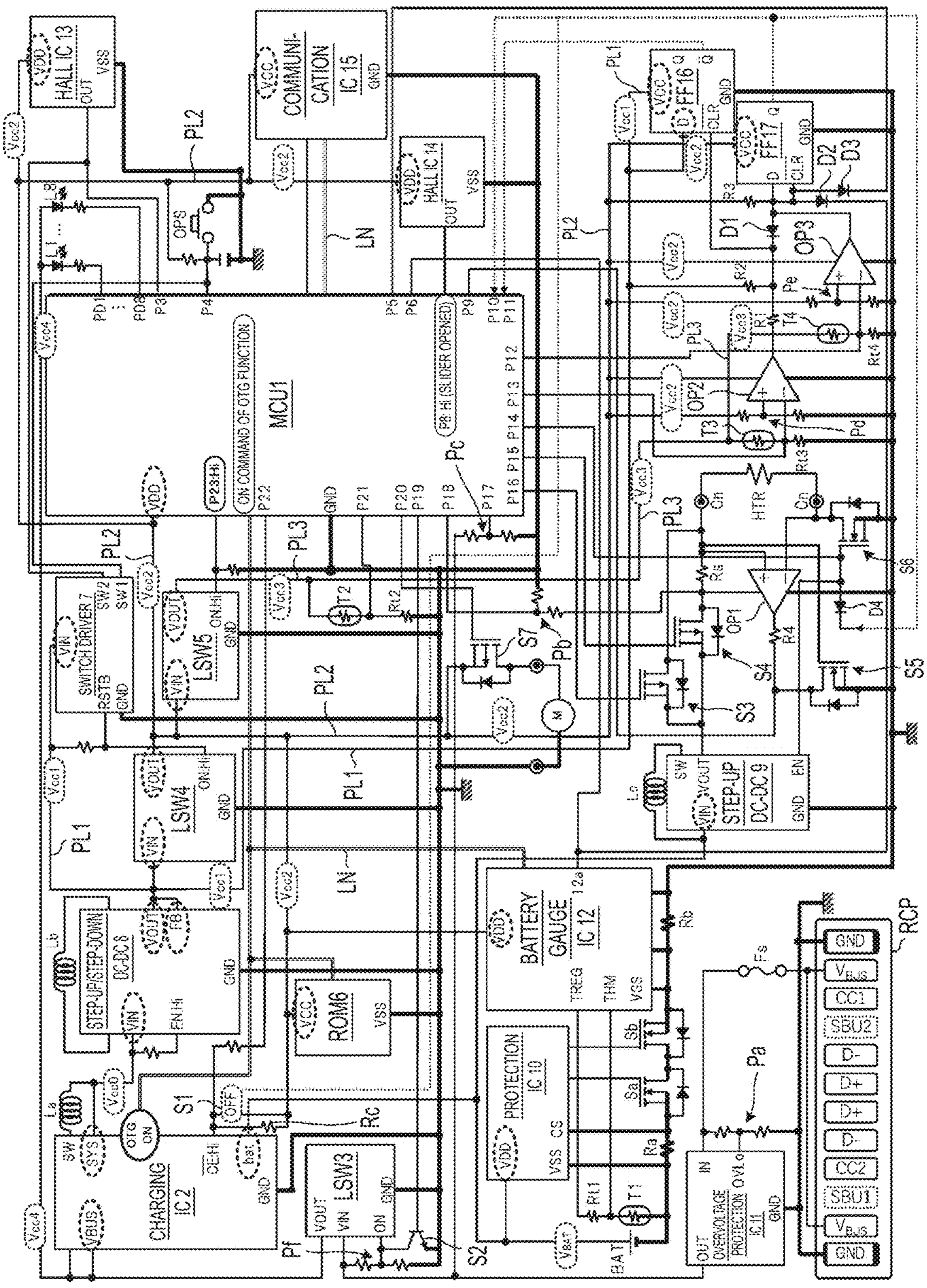
FIG. 14 is a diagram for explaining an operation of the electric circuit in an active mode.
Figure 15:
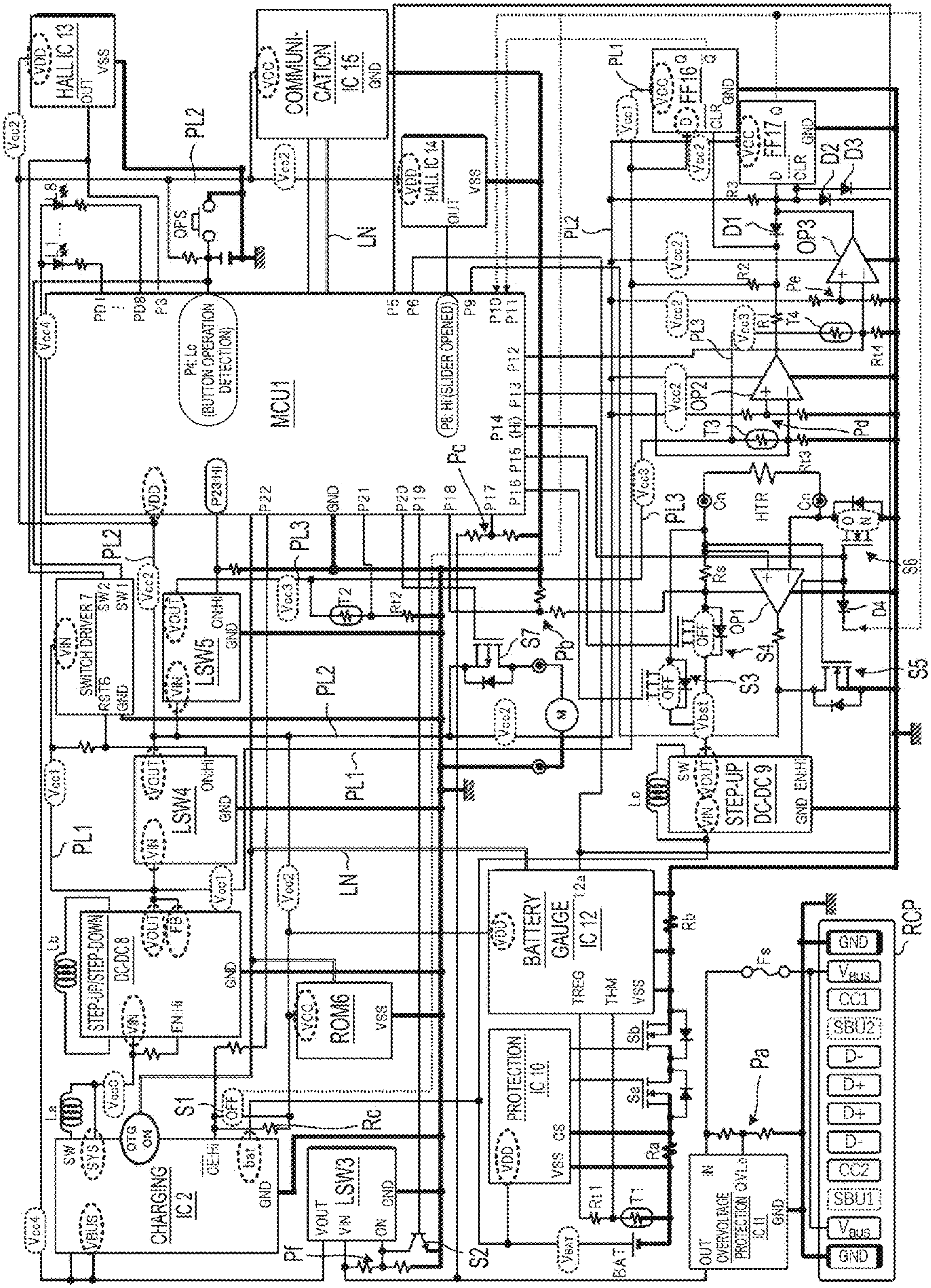
FIG. 15 is a diagram for explaining an operation of the electric circuit in a heating initialization mode.
Figure 16:
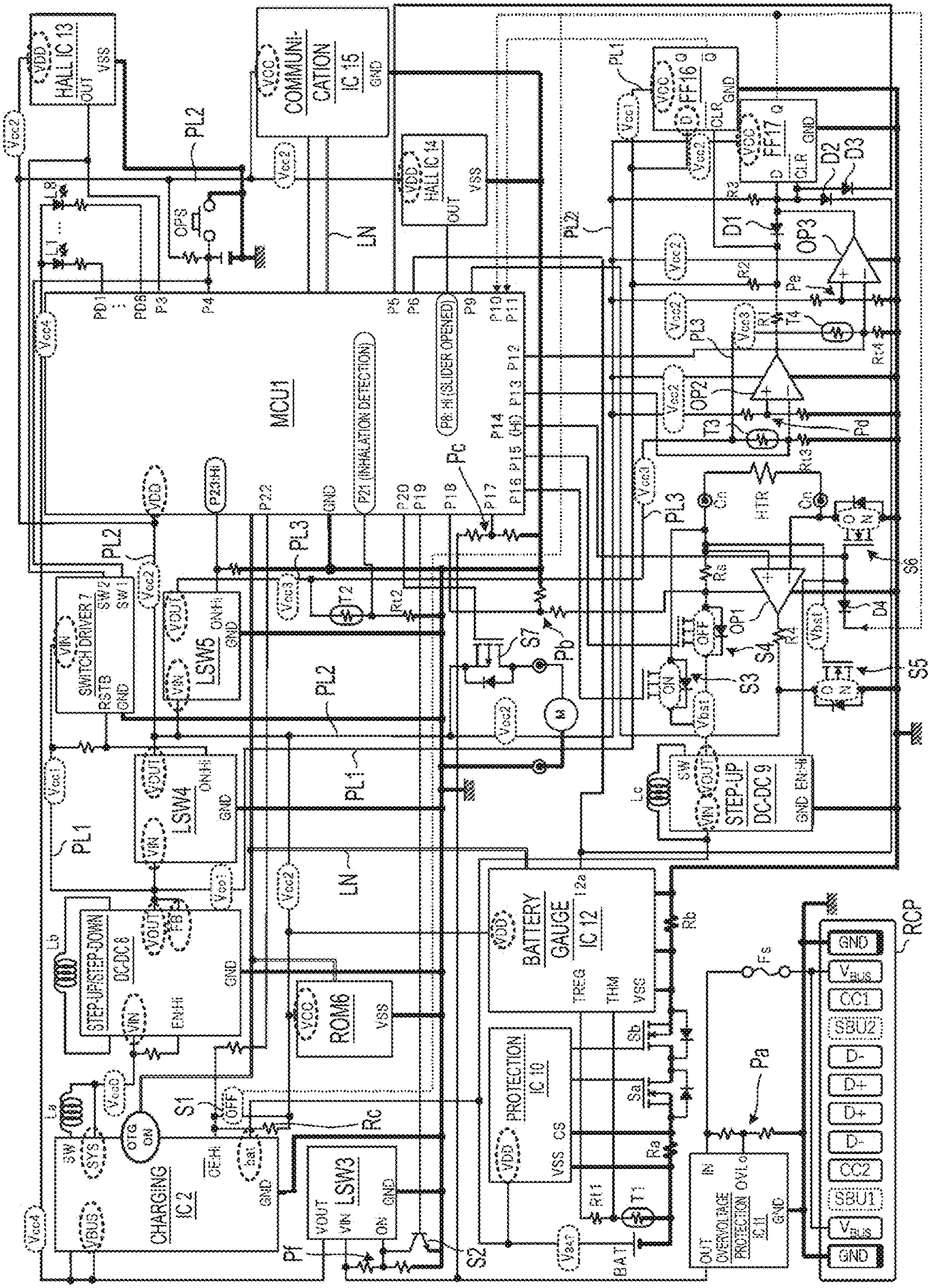
FIG. 16 is a diagram for explaining an operation of the electric circuit when a heater is heated in a heating mode.
Figure 17:
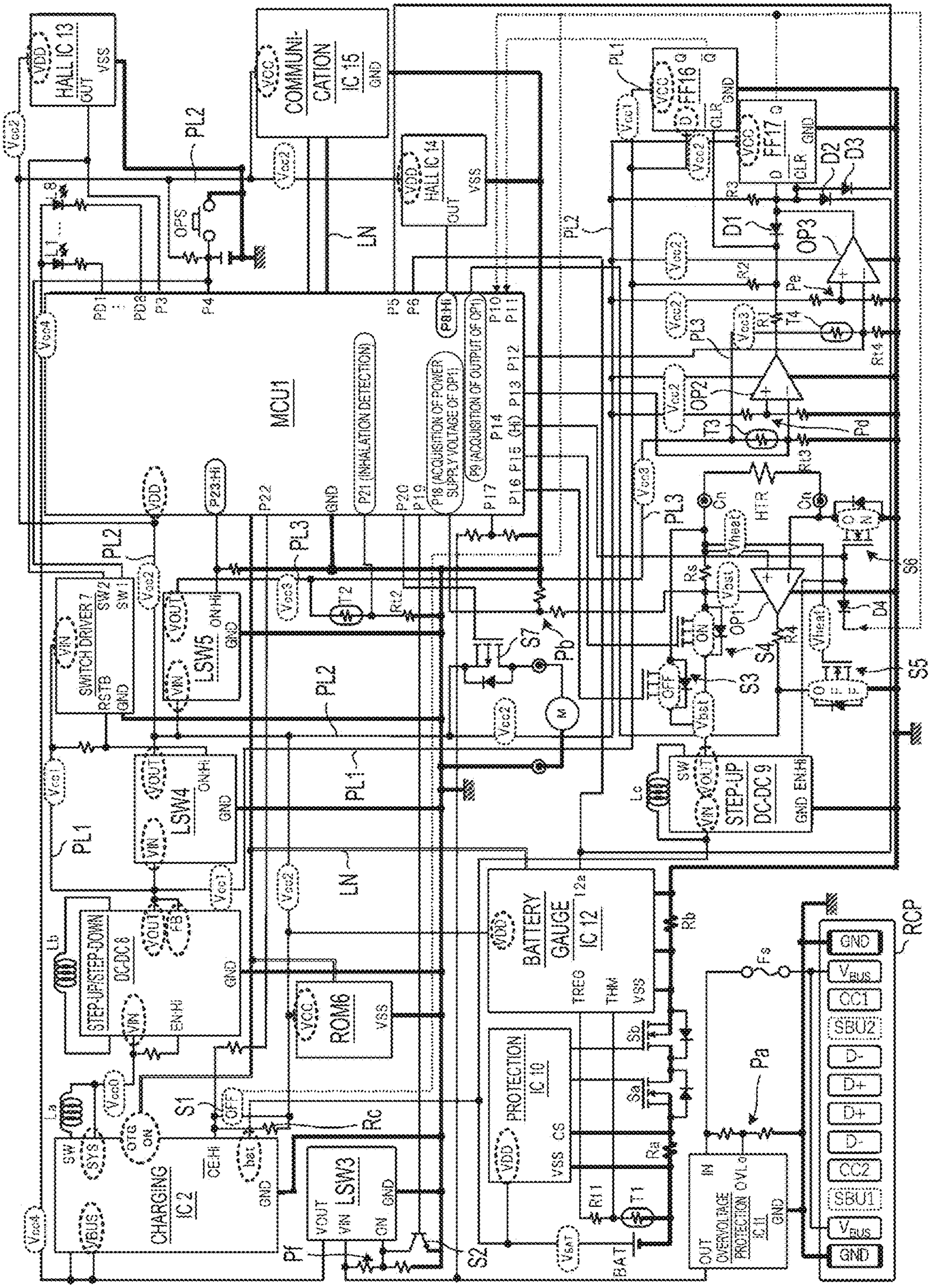
FIG. 17 is a diagram for explaining an operation of the electric circuit when a temperature of the heater is detected in the heating mode.
Figure 18:
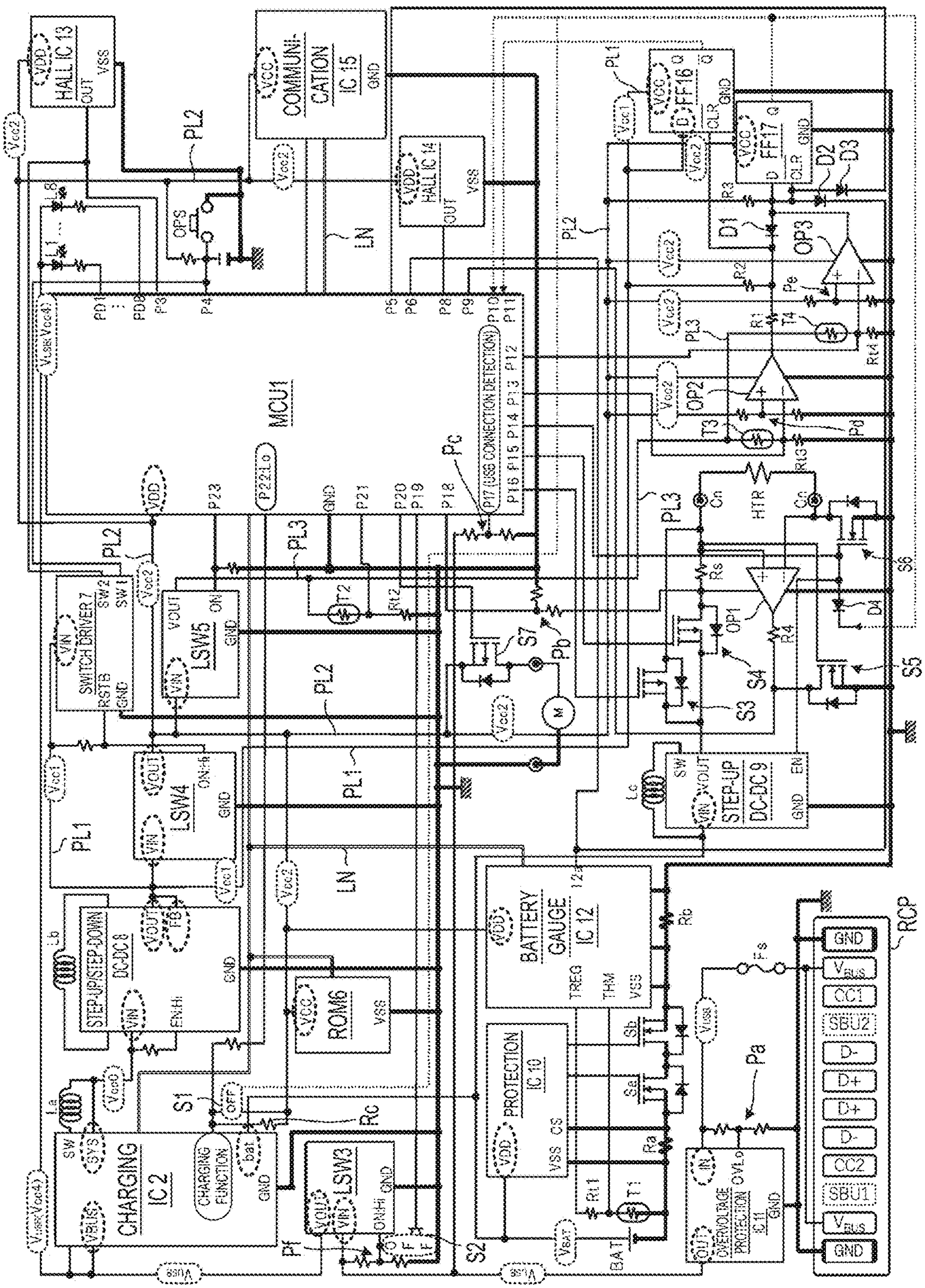
FIG. 18 is a diagram for explaining an operation of the electric circuit in a charging mode.
Figure 19:
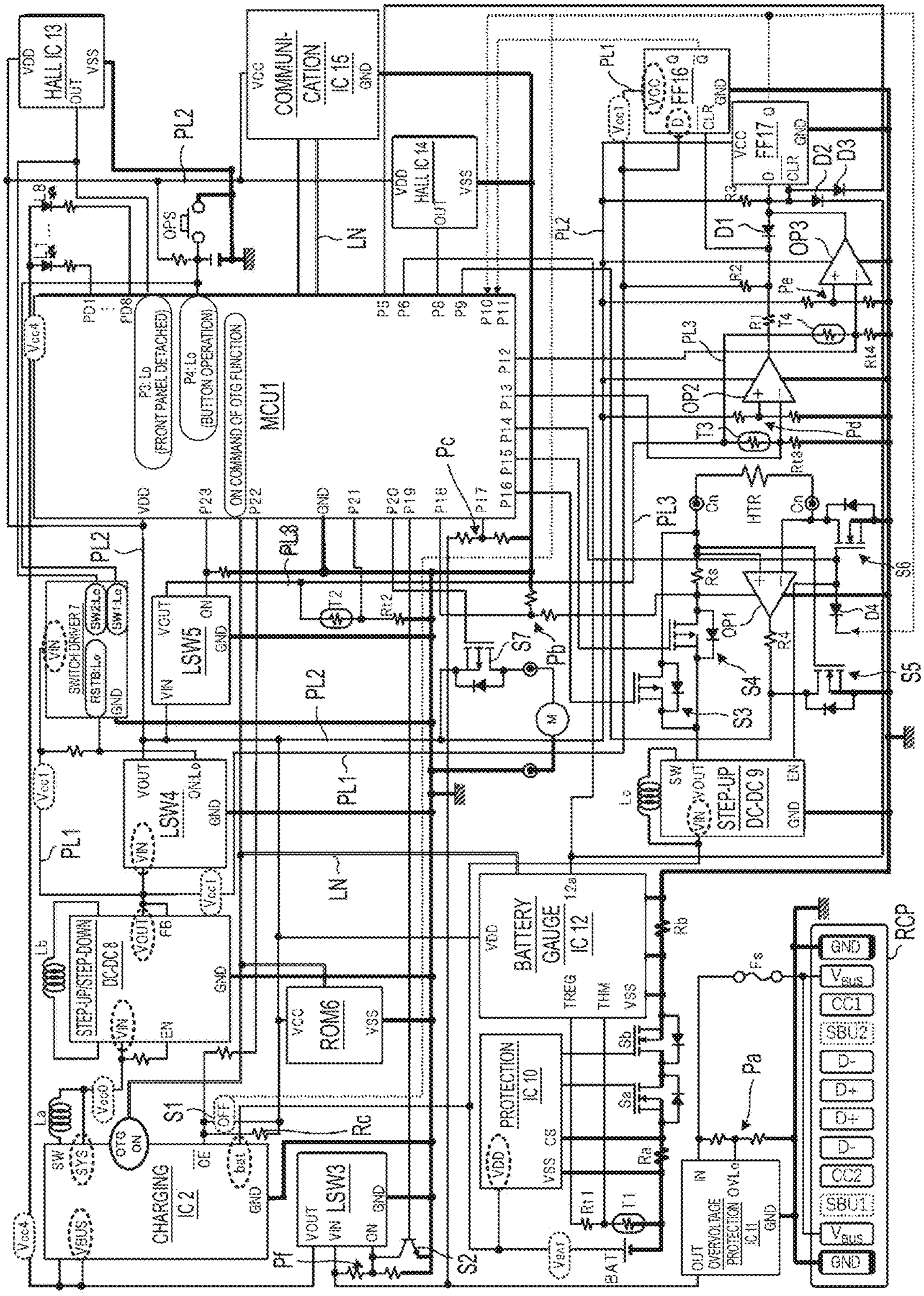
FIG. 19 is a diagram for explaining an operation of the electric circuit when MCU is reset (restarted)

Hereinafter, an operation of the electric circuit shown in FIG. 10 will be described with reference to FIGS. 13 to 19. FIG. 13 is a diagram for explaining an operation of the electric circuit in the sleep mode. FIG. 14 is a diagram for explaining an operation of the electric circuit in the active mode. FIG. 15 is a diagram for explaining an operation of the electric circuit in the heating initialization mode. FIG. 16 is a diagram for explaining an operation of the electric circuit when the heater HTR is heated in the heating mode. FIG. 17 is a diagram for explaining an operation of the electric circuit when a temperature of the heater HTR is detected in the heating mode. FIG. 18 is a diagram for explaining an operation of the electric circuit in the charging mode. FIG. 19 is a diagram for explaining an operation of the electric circuit when the MCU 1 is reset (restarted). In each of FIGS. 13 to 19, among the terminals of the chipped electronic components, terminals surrounded by dashed ellipses indicate terminals to which or from which the power supply voltage $V_{BAT}$, the USB voltage $V_{USB}$, the system power supply voltage, and the like are input or output.

In any operation mode, the power supply voltage $V_{BAT}$ is input to the power supply terminal VDD of the protection IC 10, the input terminal VIN of the step-up DC-DC converter 9, and the charging terminal bat of the charging IC 2.

<Sleep Mode: FIG. 13>

The MCU 1 enables the $V_{BAT}$ power path function of the charging IC 2 and disables the OTG function and the charging function. Since the USB voltage $V_{USB}$ is not input to the input terminal VBUS of the charging IC 2, the $V_{BAT}$ power path function of the charging IC 2 is enabled. Since a signal for enabling the OTG function is not output from the MCU 1 to the charging IC 2 from the communication line LN, the OTG function is disabled. Therefore, the charging IC 2 generates the system power supply voltage Vcc0 from the power supply voltage $V_{BAT}$ input to the charging terminal bat, and outputs the system power supply voltage Vcc0 from the output terminal SYS. The system power supply voltage Vcc0 output from the output terminal SYS is input to the input terminal VIN and the enable terminal EN of the step-up/step-down DC-DC converter 8. The step-up/step-down DC-DC converter 8 is enabled when the high-level system power supply voltage Vcc0 is input to the enable terminal EN having a positive logic, generates the system power supply voltage Vcc1 from the system power supply voltage Vcc0, and outputs the system power supply voltage Vcc1 from the output terminal VOUT. The system power supply voltage Vcc1 output from the output terminal VOUT of the step-up/step-down DC-DC converter 8 is supplied to the input terminal VIN of the LSW 4, the control terminal ON of the LSW 4, the input terminal VIN of the switch driver 7, and the power supply terminal VCC and the D terminal of the FF 16.

When the system power supply voltage Vcc1 is input to the control terminal ON, the LSW 4 outputs the system power supply voltage Vcc1 input to the input terminal VIN as the system power supply voltage Vcc2 from the output terminal VOUT. The system power supply voltage Vcc2 output from the LSW 4 is input to the power supply terminal VDD of the MCU 1, the input terminal VIN of the LSW 5, the power supply terminal VDD of the Hall IC 13, the power supply terminal VCC of the communication IC 15, and the power supply terminal VDD of the Hall IC 14. Further, the system power supply voltage Vcc2 is supplied to the power supply terminal VDD of the battery gauge IC 12, the power supply terminal VCC of the ROM 6, the resistor Rc and the bipolar transistor S1 connected to the charge enable terminal CE (−) of the charging IC 2, the power supply terminal VCC of the FF 17, the positive power supply terminal of the operational amplifier OP3, the voltage divider Pe, the positive power supply terminal of the operational amplifier OP2, and the voltage divider Pd. The bipolar transistor S1 connected to the charging IC 2 is turned off unless the low-level signal is output from the Q terminal of the FF 17. Therefore, the system power supply voltage Vcc2 generated by the LSW 4 is also input to the charge enable terminal CE (−) of the charging IC 2. Since the charge enable terminal CE (−) of the charging IC 2 has a negative logic, the charging function of the charging IC 2 is turned off in this state.

As described above, in the sleep mode, since the LSW 5 stops outputting the system power supply voltage Vcc3, the power supply to the electronic components connected to the power supply line PL3 is stopped. In the sleep mode, since the OTG function of the charging IC 2 is stopped, the power supply to the LEDs L1 to L8 is stopped.

<Active Mode: FIG. 14>

When the MCU 1 detects that the signal input to the terminal P8 becomes high level from the sleep mode of FIG. 13 and the slider 119 is opened, the MCU 1 inputs the high-level signal to the control terminal ON of the LSW 5 from the terminal P23. Accordingly, the LSW 5 outputs the system power supply voltage Vcc2 input to the input terminal VIN as the system power supply voltage Vcc3 from the output terminal VOUT. The system power supply voltage Vcc3 output from the output terminal VOUT of the LSW 5 is supplied to the thermistor T2, the thermistor T3, and the thermistor T4.

Further, when the MCU 1 detects that the slider 119 is opened, the MCU 1 enables the OTG function of the charging IC 2 via the communication line LN. Accordingly, the charging IC 2 outputs the system power supply voltage Vcc4 obtained by boosting the power supply voltage $V_{BAT}$ input from the charging terminal bat from the input terminal VBUS. The system power supply voltage Vcc4 output from the input terminal VBUS is supplied to the LEDs L1 to L8.

<Heating Initialization Mode: FIG. 15>

When the signal input to the terminal P4 becomes low level (the operation switch OPS is pressed) from the state of FIG. 14, the MCU 1 performs various settings necessary for heating, and then inputs a high-level enable signal from the terminal P14 to the enable terminal EN of the step-up DC-DC converter 9. Accordingly, the step-up DC-DC converter 9 outputs a drive voltage $V_{bst}$ obtained by boosting the power supply voltage $V_{BAT}$ from the output terminal VOUT. The drive voltage $V_{bst}$ is supplied to the switches S3 and S4. In the state, the switches S3 and S4 are turned off. The switch S6 is turned on by the high-level enable signal output from the terminal P14. Accordingly, a negative terminal of the heater HTR is connected to the ground line, and the heater HTR can be heated by turning on the switch S3. After the enable signal of the high-level signal is output from the terminal P14 of the MCU 1, the MCU 1 shifts to the heating mode.

<Heater Heating in Heating Mode: FIG. 16>

In the state of FIG. 15, the MCU 1 starts switching control of the switch S3 connected to the terminal P16 and switching control of the switch S4 connected to the terminal P15. The switching control may be automatically started when the heating initialization mode is completed, or may be started by further pressing the operation switch OPS. Specifically, as shown in FIG. 16, the MCU 1 performs heating control in which the switch S3 is turned on, the switch S4 is turned off, the drive voltage $V_{bst}$ is supplied to the heater HTR, and the heater HTR is heated for generating an aerosol, and as shown in FIG. 17, the MCU 1 performs temperature detection control in which the switch S3 is turned off, the switch S4 is turned on, and the temperature of the heater HTR is detected.

As shown in FIG. 16, during the heating control, the drive voltage $V_{bst}$ is also supplied to a gate of the switch S5, and the switch S5 is turned on. During the heating control, the drive voltage $V_{bst}$ passing through the switch S3 is also input to the positive power supply terminal of the operational amplifier OP1 via the resistor Rs. A resistance value of the resistor Rs is negligibly small as compared with an internal resistance value of the operational amplifier OP1. Therefore, during the heating control, the voltage input to the positive power supply terminal of the operational amplifier OP1 is substantially equal to the drive voltage $V_{bst}$.

A resistance value of the resistor R4 is larger than an on-resistance value of the switch S5. The operational amplifier OP1 operates also during the heating control, but the switch S5 is turned on during the heating control. In a state in which the switch S5 is turned on, the output voltage of the operational amplifier OP1 is divided by a voltage divider of the resistor R4 and the switch S5 and is input to the terminal P9 of the MCU 1. Since the resistance value of the resistor R4 is larger than the on-resistance value of the switch S5, the voltage input to the terminal P9 of the MCU 1 becomes sufficiently small. Accordingly, it is possible to prevent a large voltage from being input from the operational amplifier OP1 to the MCU 1.

<Heater Temperature Detection in Heating Mode: FIG. 17>

As shown in FIG. 17, during the temperature detection control, the drive voltage $V_{bst}$ is input to the positive power supply terminal of the operational amplifier OP1 and is input to the voltage divider Pb. The voltage divided by the voltage divider Pb is input to the terminal P18 of the MCU 1. The MCU 1 acquires a reference voltage $V_{temp}$ applied to a series circuit of the resistor Rs and the heater HTR during the temperature detection control based on the voltage input to the terminal P18.

During the temperature detection control, the drive voltage $V_{bst}$ (reference voltage $V_{temp}$) is supplied to the series circuit of the resistor Rs and the heater HTR. A voltage $V_{heat}$ obtained by dividing the drive voltage $V_{bst}$ (reference voltage $V_{temp}$) by the resistor Rs and the heater HTR is input to the non-inverting input terminal of the operational amplifier OP1. Since the resistance value of the resistor Rs is sufficiently larger than the resistance value of the heater HTR, the voltage $V_{heat}$ is sufficiently lower than the drive voltage $V_{bst}$. During the temperature detection control, the low voltage $V_{heat}$ is also supplied to the gate terminal of the switch S5, so that the switch S5 is turned off. The operational amplifier OP1 amplifies a difference between the voltage input to the inverting input terminal and the voltage $V_{heat}$ input to the non-inverting input terminal and outputs the amplified difference.

An output signal of the operational amplifier OP1 is input to a terminal P9 of the MCU 1. The MCU 1 acquires a temperature of the heater HTR based on the signal input to the terminal P9, the reference voltage $V_{temp}$ acquired based on the input voltage of the terminal P18, and the known electric resistance value of the resistor Rs. The MCU 1 performs heating control of the heater HTR (for example, control such that the temperature of the heater HTR becomes a target temperature) based on the acquired temperature of the heater HTR.

The MCU 1 can acquire the temperature of the heater HTR even in a period in which the switches S3 and S4 are turned off (a period in which the heater HTR is not energized). Specifically, the MCU 1 acquires the temperature of the heater HTR based on the voltage input to the terminal P13 (output voltage of the voltage divider including the thermistor T3 and the resistor Rt3).

The MCU 1 can also acquire the temperature of the case 110 at any timing. Specifically, the MCU 1 acquires the temperature of the case 110 based on the voltage input to the terminal P12 (output voltage of the voltage divider including the thermistor T4 and the resistor Rt4).

<Charging Mode: FIG. 18>

FIG. 18 illustrates a case where a USB connection is established in the sleep mode. When the USB connection is established, the USB voltage $V_{USB}$ is input to the input terminal VIN of the LSW 3 via the overvoltage protection IC 11. The USB voltage $V_{USB}$ is also supplied to the voltage divider Pf connected to the input terminal VIN of the LSW 3. Since the bipolar transistor S2 is turned on immediately after the USB connection is established, the signal input to the control terminal ON of the LSW 3 remains at the low level. The USB voltage $V_{USB}$ is also supplied to the voltage divider Pc connected to the terminal P17 of the MCU 1, and a voltage divided by the voltage divider Pc is input to the terminal P17. The MCU 1 detects that the USB connection is established based on the voltage input to the terminal P17.

When the MCU 1 detects that the USB connection is established, the MCU 1 turns off the bipolar transistor S2 connected to the terminal P19. When a low-level signal is input to the gate terminal of the bipolar transistor S2, the USB voltage $V_{USB}$ divided by the voltage divider Pf is input to the control terminal ON of the LSW 3. Accordingly, a high-level signal is input to the control terminal ON of the LSW 3, and the LSW 3 outputs the USB voltage $V_{USB}$ from the output terminal VOUT. The USB voltage $V_{USB}$ output from the LSW 3 is input to the input terminal VBUS of the charging IC 2. The USB voltage $V_{USB}$ output from the LSW 3 is directly supplied to the LEDs L1 to L8 as the system power supply voltage Vcc4. When the MCU 1 detects that the USB connection is established, the MCU 1 further outputs a low-level enable signal from the terminal P22 to the charge enable terminal CE (–) of the charge IC 2. Accordingly, the charging IC 2 enables the charging function of the power supply BAT and starts charging the power supply BAT by the USB voltage $V_{USB}$ input to the input terminal VBUS.

In a case where the USB connection is established in the active mode, when the MCU 1 detects that the USB connection is established, the MCU 1 turns off the bipolar transistor S2 connected to the terminal P19, outputs a low-level enable signal from the terminal P22 to the charge enable terminal CE (–) of the charging IC 2, and turns off the OTG function of the charging IC 2 by serial communication using the communication line LN. Accordingly, the system power supply voltage Vcc4 supplied to the LEDs L1 to L8 is switched from a voltage (voltage based on the power supply voltage $V_{BAT}$) generated by the OTG function of the charging IC 2 to the USB voltage $V_{USB}$ output from the LSW 3. The LEDs L1 to L8 do not operate unless the built-in transistors are turned on by the MCU 1. Therefore, an unstable voltage in a transition period from ON to OFF of the OTG function is prevented from being supplied to the LEDs L1 to L8.

<MCU Reset: FIG. 19>

When the outer panel 115 is detached, the output of the Hall IC 13 becomes low level, the operation switch OPS is turned on, and the signal input to the terminal P4 of the MCU 1 becomes low level, the terminal SW1 and the terminal SW2 of the switch driver 7 both become low level. Accordingly, the switch driver 7 outputs a low-level signal from the reset input terminal RSTB. The low-level signal output from the reset input terminal RSTB is input to the control terminal ON of the LSW 4. Accordingly, the LSW 4 stops the output of the system power supply voltage Vcc2 from the output terminal VOUT. When the output of the system power supply voltage Vcc2 is stopped, the system power supply voltage Vcc2 is not input to the power supply terminal VDD of the MCU 1, and thus the MCU 1 is stopped.

The switch driver 7 returns the signal output from the reset input terminal RSTB to high level when the time during which the low-level signal is output from the reset input terminal RSTB reaches a predetermined time or when the signal input to either the terminal SW1 or the terminal SW2 becomes high level. Accordingly, the control terminal ON of the LSW 4 becomes high level, and the MCU 1 returns to a state in which the system power supply voltage Vcc2 is supplied to each unit.

<Details of Function of Charging IC>

Figure 20:
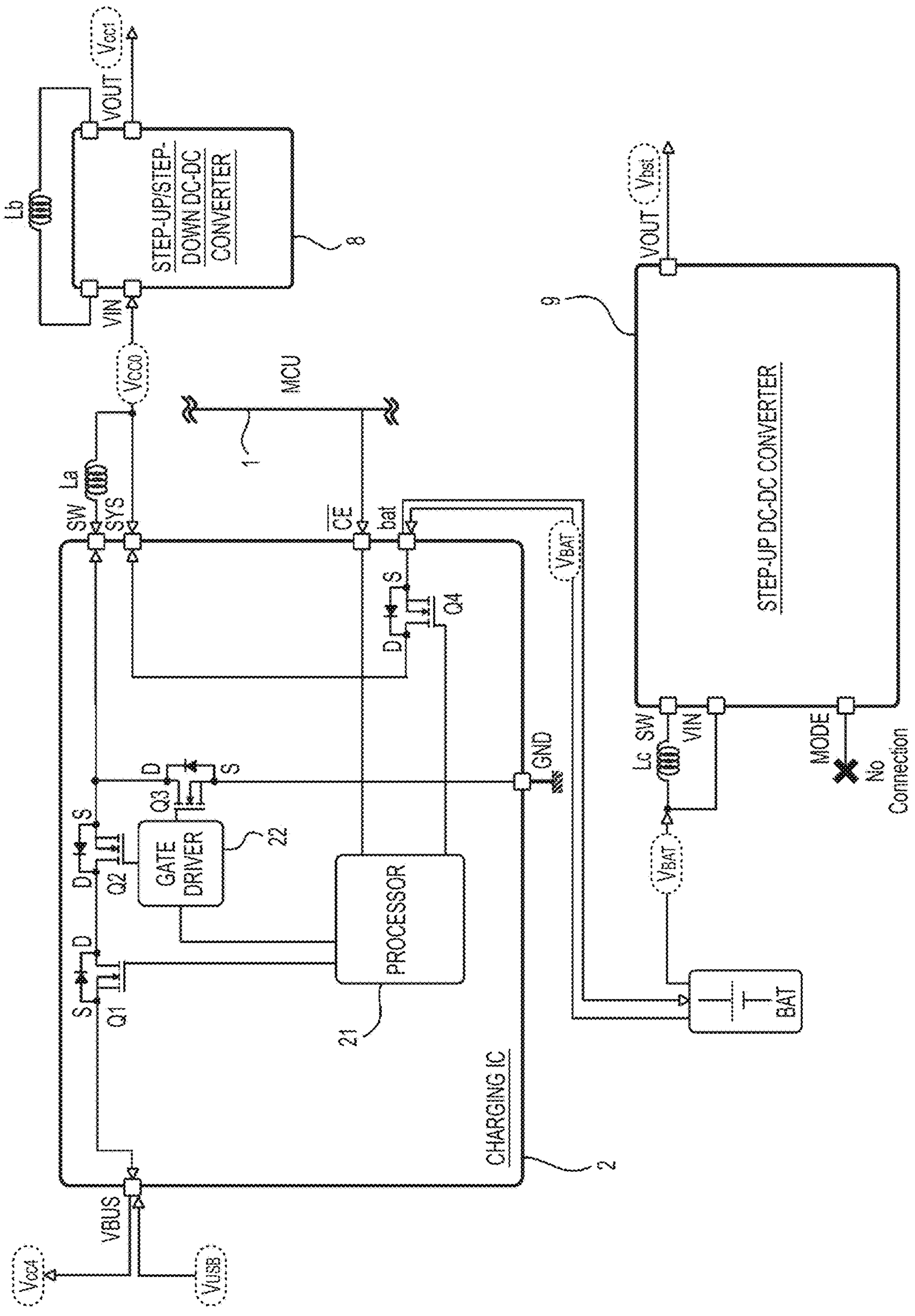
FIG. 20 shows a schematic internal configuration of a charging IC.

FIG. 20 shows a schematic internal configuration of the charging IC 2. The charging IC 2 includes a processor 21, a gate driver 22, and switches Q1 to Q4 configured by N-channel MOSFETs.

A source terminal of a switch Q1 is connected to the input terminal VBUS. A drain terminal of the switch Q1 is connected to a drain terminal of a switch Q2. A source terminal of the switch Q2 is connected to the switching terminal SW. A drain terminal of a switch Q3 is connected to a connection node between the switch Q2 and the switching terminal SW. A source terminal of the switch Q3 is connected to the ground terminal GND. A drain terminal of a switch Q4 is connected to the output terminal SYS. A source terminal of the switch Q4 is connected to the charging terminal bat.

The gate driver 22 is connected to a gate terminal of the switch Q2 and a gate terminal of the switch Q3, and performs on/off control of the switches Q2 and Q3 based on a command from the processor 21.

The processor 21 is connected to the gate driver 22, a gate terminal of the switch Q1, a gate terminal of the switch Q4, and the charge enable terminal CE (–). The processor 21 performs on/off control of the switches Q2 and Q3 and on/off control of the switches Q1 and Q4 via the gate driver 22.

The charging IC 2 includes a $V_{USB}$ power path function and a $V_{USB}$ & $V_{BAT}$ power path function in addition to the above-described charging function, $V_{BAT}$ power path function, and OTG function. Hereinafter, internal control contents of the charging IC 2 when each function is enabled will be described. Specific numerical values of the various voltages described above are preferably values shown below.

Power supply voltage $V_{BAT}$ (full charge voltage)=4.2 V
Power supply voltage $V_{BAT}$ (nominal voltage)=3.7 V
System power supply voltage Vcc1=3.3 V
System power supply voltage Vcc2=3.3 V
System power supply voltage Vcc3=3.3 V
System power supply voltage Vcc4=5.0 V
USB voltage $V_{USB}$=5.0 V
Drive voltage $V_{bst}$=4.9 V (Charging Function)

The processor 21 performs on/off control of the switch Q2 and the switch Q4 while controlling the switch Q1 to be on and the switch Q3 to be off. The on/off control of the switch Q4 is performed to adjust a charging current of the power supply BAT. The processor 21 performs on/off control of the switch Q2 so that a voltage of the output terminal SYS becomes equal to a voltage suitable for charging the power supply BAT. Accordingly, the USB voltage $V_{USB}$ input to the input terminal VBUS is stepped down and output from the output terminal SYS. The voltage output from the output terminal SYS is input to the input terminal VIN of the step-up/step-down DC-DC converter 8 as the system power supply voltage Vcc0, and is output from the charging terminal bat of the charging IC 2. Accordingly, the power supply BAT is charged with a voltage obtained by stepping down the USB voltage $V_{USB}$. When the charging function is enabled, the system power supply voltage Vcc0 finally becomes the same value as the full charge voltage of the power supply BAT. Therefore, the step-up/step-down DC-DC converter 8 steps down a system power supply voltage Vcc0 of 4.2 V input to the input terminal VIN to generate and output a system power supply voltage Vcc1 of 3.3 V. When the charging function is enabled, in the charging IC 2, a potential of the input terminal VBUS is higher than a potential of the output terminal SYS, and thus the electric power from the power supply BAT is not output from the input terminal VBUS.

($V_{USB}$ Power Path Function)

The $V_{USB}$ power path function is effective, for example, when the power supply BAT cannot be used due to over-discharge or the like. The processor 21 turns on the switch Q1, turns on the switch Q2, turns off the switch Q3, and turns off the switch Q4. Accordingly, the USB voltage $V_{USB}$ input to the input terminal VBUS is directly output from the switching terminal SW without being stepped down. The voltage output from the switching terminal SW is input to the input terminal VIN of the step-up/step-down DC-DC converter 8 as the system power supply voltage Vcc0. Also in this case, the step-up/step-down DC-DC converter 8 steps down a system power supply voltage Vcc0 of 5 V input to the input terminal VIN to generate and output a system power supply voltage Vcc1 of 3.3 V. Even when the $V_{USB}$ power path function is enabled, the processor 21 may perform on/off control of the switch Q2 while controlling the switch Q1 to be on, the switch Q3 to be off, and the switch Q4 to be on. In this way, a step-down operation from the USB voltage $V_{USB}$ of 5.0 V to the system power supply voltage Vcc1 of 3.3V can be performed by the charging IC 2 and the step-up/step-down DC-DC converter 8 in a shared manner. Therefore, concentration of load and heat generation on the step-up/step-down DC-DC converter 8 can be prevented.

($V_{USB}$ & $V_{BAT}$ Power Path Function)

The $V_{USB}$ & $V_{BAT}$ power path function is enabled, for example, when the charging of the power supply BAT is completed and the USB connection is continued. The processor 21 performs on/off control of the switch Q2 while controlling the switch Q1 to be on, the switch Q3 to be off, and the switch Q4 to be on. The processor 21 controls the switch Q2 so that the voltage of the output terminal SYS becomes equal to the voltage of the power supply BAT (power supply voltage $V_{BAT}$). Accordingly, the USB voltage $V_{USB}$ input to the input terminal VBUS is stepped down and output from the output terminal SYS. The voltage output from the output terminal SYS after stepping down the USB voltage $V_{USB}$ input to the input terminal VBUS and the voltage output from the output terminal SYS via the charging terminal bat from the power supply BAT have the same value. Therefore, the electric power including the voltage obtained by stepping down the USB voltage $V_{USB}$ and the electric power including the power supply voltage $V_{BAT}$ output from the output terminal SYS are combined and supplied to the input terminal VIN of the step-up/step-down DC-DC converter 8. When the $V_{USB}$ & $V_{BAT}$ power path function is enabled, in the charging IC 2, the potential of the input terminal VBUS is higher than the potential of the output terminal SYS, and thus the electric power from the power supply BAT is not output from the input terminal VBUS.

When the $V_{USB}$ & $V_{BAT}$ power path function is enabled, the step-up/step-down DC-DC converter 8 determines whether to step up or step down depending on the magnitude of the power supply voltage $V_{BAT}$. When the power supply voltage $V_{BAT}$ is 3.3 V or more, the step-up/step-down DC-DC converter 8 steps down the system power supply voltage Vcc0 input to the input terminal VIN to generate and output the system power supply voltage Vcc1 of 3.3 V. When the power supply voltage $V_{BAT}$ is less than 3.3 V, the step-up/step-down DC-DC converter 8 steps up the system power supply voltage Vcc0 input to the input terminal VIN to generate and output the system power supply voltage Vcc1 of 3.3 V.

($V_{BAT}$ Power Path Function)

The $V_{BAT}$ power path function is enabled in a mode (for example, a sleep mode) other than the charging mode. The processor 21 controls the switches Q1 and Q3 to be off. Accordingly, the power supply voltage $V_{BAT}$ input to the charging terminal bat is directly output from the output terminal SYS, and is input to the input terminal VIN of the step-up/step-down DC-DC converter 8 as the system power supply voltage Vcc0. By the control, a power transmission path between the input terminal VBUS and the switching terminal SW of the charging IC 2 is blocked by a parasitic diode of the switch Q1. Therefore, the power supply voltage $V_{BAT}$ output from the output terminal SYS is not output from the input terminal VBUS.

When the $V_{BAT}$ power path function is enabled, the step-up/step-down DC-DC converter 8 determines whether to step up or step down depending on the magnitude of the power supply voltage $V_{BAT}$. When the power supply voltage $V_{BAT}$ input to the input terminal VIN is 3.3 V or more, the step-up/step-down DC-DC converter 8 steps down the power supply voltage $V_{BAT}$ to generate and output the system power supply voltage Vcc1 of 3.3 V. When the power supply voltage $V_{BAT}$ input to the input terminal VIN is less than 3.3 V, the step-up/step-down DC-DC converter 8 steps up the power supply voltage $V_{BAT}$ to generate and output the system power supply voltage Vcc1 of 3.3 V.

(OTG Function)

The OTG function is enabled simultaneously with the $V_{BAT}$ power path function, for example, in the active mode. When both the OTG function and the $V_{BAT}$ power path function are enabled, the processor 21 performs on/off control of the switch Q3 while controlling the switch Q1 to be on. Accordingly, the power supply voltage $V_{BAT}$ input to the charging terminal bat is directly output from the output terminal SYS, and is input to the input terminal VIN of the step-up/step-down DC-DC converter 8 as the system power supply voltage Vcc0. The power supply voltage $V_{BAT}$ output from the output terminal SYS is input to the switching terminal SW of the charging IC 2. The processor 21 controls the switch Q3 so that the power supply voltage $V_{BAT}$ input to the switching terminal SW becomes equal to the system power supply voltage Vcc4. Accordingly, the power supply voltage $V_{BAT}$ input to the switching terminal SW is stepped up and output from the input terminal VBUS. The voltage output from the input terminal VBUS is input to the LEDs L1 to L8 as the system power supply voltage Vcc4.

As described above, the charging IC 2 has both a function as a step-down converter that steps down the USB voltage $V_{USB}$ and a function as a step-up converter that steps up the power supply voltage $V_{BAT}$. The voltage input from the charging IC 2 to the step-up/step-down DC-DC converter 8 varies in various ways according to the enabled function of the charging IC 2. However, even if such a variation occurs, the step-up/step-down DC-DC converter 8 selectively performs step-up and step-down, so that the system power supply voltage Vcc1 (electric power including the system power supply voltage Vcc1) can be kept constant. When the voltage of the system power supply voltage Vcc0 input to the input terminal VIN of the step-up/step-down DC-DC converter 8 is equal to 3.3 V which is the voltage of the system power supply voltage Vcc1, the step-up/step-down DC-DC converter 8 does not perform step-up and step-down, and outputs the system power supply voltage Vcc0 as the system power supply voltage Vcc1 from the output terminal VOUT.

<Power Consumption of Electric Circuit>

In the inhalation system including the inhaler 100, the heater HTR consumes the largest amount of electric power among all loads included in the system. For example, power consumption $P_{HTR}$ of the heater HTR is larger than power consumption $P_{LED}$ of each of the LEDs L1 to L8. The power consumption of the heater HTR is larger than total power consumption of all the electronic components connected to the output terminal SYS of the charging IC 2. Therefore, a current value that the step-up DC-DC converter 9 connected to the heater HTR can receive from the power supply BAT is preferably larger than the maximum current value that the output terminal SYS of the charging IC 2 can output.

<Preferred Embodiment of Step-Up/Step-Down DC-DC Converter 8>

From the viewpoint of reducing the cost and size of the step-up/step-down DC-DC converter 8, at least one of the maximum input current and the maximum output current of the step-up/step-down DC-DC converter 8 is preferably smaller than the maximum current that can be output from the output terminal SYS of the charging IC 2. With this configuration, when the output terminal SYS of the charging IC 2 outputs the maximum current, an excessive current may be input to the step-up/step-down DC-DC converter 8. However, since the heater HTR that consumes the largest amount of electric power is not connected to the output terminal VOUT of the step-up/step-down DC-DC converter 8, an excessive current is not input to the step-up/step-down DC-DC converter 8. Therefore, even with such a configuration, it is possible to reduce the cost and the size without causing failure in the step-up/step-down DC-DC converter 8.

<Preferred Embodiment of Step-Up DC-DC Converter 9>

The step-up DC-DC converter 9 is preferably a switching regulator. In the example of FIG. 20, the step-up DC-DC converter 9 performs step-up by operating in either a pulse frequency modulation (PFM) mode in which PFM control is performed or a pulse width modulation (PWM) mode in which PWM control is performed. Specifically, a mode terminal MODE for mode switching is mounted on the step-up DC-DC converter 9, and the operation mode can be switched according to the potential of the mode terminal MODE. The maximum current that can be input to the switching terminal SW of the step-up DC-DC converter 9 when the step-up DC-DC converter 9 operates in the PFM mode is preferably larger than the maximum current that can be input to the switching terminal SW of the step-up DC-DC converter 9 when the step-up DC-DC converter 9 operates in the PWM mode.

The voltage applied to the heater HTR differs greatly between the heating control and the temperature detection control. That is, a load of the step-up DC-DC converter 9 fluctuates between a heavy load and a light load. In the PWM mode, since a switching frequency is constant regardless of the load, a switching loss becomes dominant and the efficiency decreases at a light load. On the other hand, in the PFM mode, since the addition of electric power is not required so much at the light load, the switching frequency becomes low and the switching loss decreases. Therefore, high efficiency can be maintained even at a light load. When a load level increases from a light load to a heavy load, the efficiency relationship is reversed, and the PWM mode has higher efficiency than the PFM mode. The degree of load for which the PWM mode is more efficient is within a limited range. Therefore, when the load of the step-up DC-DC converter 9 fluctuates between a heavy load and a light load, the step-up DC-DC converter 9 preferably operates in the PFM mode.

In the case of operating in either the PWM mode or the PFM mode, the efficiency of the step-up DC-DC converter 9 tends to decrease in the vicinity of the maximum current that can be input to the step-up DC-DC converter 9 or the maximum current that can be output from the step-up DC-DC converter 9. In particular, in the case of operating in the PFM mode, since the step-up DC-DC converter 9 has the characteristic that the efficiency thereof decreases at the heavy load, the efficiency of the DC-DC converter decreases due to a double factor in the vicinity of the maximum current. Therefore, as described above, the step-up DC-DC converter 9 is used in which the maximum current that can be input to the switching terminal SW of the step-up DC-DC converter 9 when operating in the PFM mode is larger than the maximum current that can be input to the switching terminal SW of the step-up DC-DC converter 9 when operating in the PWM mode. Accordingly, even when the step-up DC-DC converter 9 is operated in the PFM mode, it is possible to prevent a decrease in efficiency at a heavy load.

From the viewpoint of the efficiency, a potential of the mode terminal MODE is preferably maintained at a potential at which the PFM mode is selected. In the example of FIG. 20, since the mode terminal MODE is not connected to anywhere, the operation mode of the step-up DC-DC converter 9 is fixed to the PFM mode. Accordingly, a larger current can be input to the switching terminal SW of the step-up DC-DC converter 9, and a larger current can flow to the heater HTR. It should be noted that such a configuration that makes the potential of the mode terminal MODE unstable is merely a specific example. Depending on the specification of the step-up DC-DC converter 9, the PFM mode may be selected by setting the potential of the mode terminal MODE to high level or low level. In such a case, the potential of the mode terminal MODE may be maintained at an appropriate potential so that the PFM mode is selected.

<Effects of Inhaler>

According to the inhaler 100, the voltage is not directly supplied from the power supply BAT to the LEDs L1 to L8 serving as the notification unit, but is supplied via the charging IC 2. Although the voltage of the power supply BAT fluctuates, the fluctuating voltage is not directly supplied to the LEDs L1 to L8, and thus the LEDs L1 to L8 can be stably operated. Since the luminance of the LEDs depends on the supplied voltage, if a stable voltage can be supplied to the LEDs L1 to L8, the luminance of the LEDs L1 to L8 can be stabilized. In addition, since the charging IC 2 whose main function is to control the charging of the power supply BAT generates the system power supply voltage Vcc4 and supplies the system power supply voltage Vcc4 to the LEDs L1 to L8, a dedicated IC for generating the system power supply voltage Vcc4 is not necessary. Therefore, the size and cost of the inhaler 100 can be reduced. Further, since the charging IC 2 generates the system power supply voltage Vcc4 by boosting the power supply voltage $V_{BAT}$, it is possible to supply high voltage power to the LEDs L1 to L8. Accordingly, the LEDs L1 to L8 can be lit with high luminance, and a good user interface can be realized.

In addition, according to the inhaler 100, electric power is not directly supplied from the power supply BAT to the MCU 1, but the electric power is supplied via the charging IC 2. Since the charging IC 2 whose main function is to control the charging of the power supply BAT generates the system power supply voltage Vcc0 and supplies the system power supply voltage Vcc0 to the MCU 1, a dedicated IC for generating the system power supply voltage Vcc0 is unnecessary. Therefore, the size and cost of the inhaler 100 can be reduced. Further, since the step-up/step-down DC-DC converter 8 is provided between the charging IC 2 and the MCU 1, constant electric power can be supplied to the MCU 1. Accordingly, the operation of the MCU 1 can be stabilized.

According to the inhaler 100, the OTG function cannot be executed in a state in which the USB connection is established and the LSW 3 is closed. Therefore, the power consumption of the power supply BAT during the USB connection can be prevented, and the amount of power of the available power supply BAT can be increased. Since the LSW 3 is opened immediately after the USB connection is established, the noise and an inrush current immediately after the USB connection are not supplied to the LEDs L1 to L8, and the possibility that the LEDs L1 to L8 fail can be reduced. Immediately after the USB connection, the OTG function can be executed. Therefore, even in a transition period in which the electric power from the external power supply immediately after the USB connection cannot be supplied to the LEDs L1 to L8, the electric power can be supplied from the power supply BAT to the LEDs L1 to L8 by the OTG function. Therefore, it is possible to increase an opportunity to operate the LEDs L1 to L8, and it is possible to improve marketability of the inhaler 100.

According to the inhaler 100, since the charging IC 2 can supply the electric power of the power supply BAT to the load such as the MCU 1, a dedicated IC for supplying the electric power to the load is unnecessary, and the cost of the inhaler 100 can be reduced.

A notification unit different from the LEDs L1 to L8 may be further connected to the input terminal VBUS of the charging IC 2. For example, the input terminal VBUS of the charging IC 2 may be connected to the vibration motor M to supply the system power supply voltage Vcc4 or the USB voltage $V_{USB}$ to the vibration motor M, or the input terminal VBUS of the charging IC 2 may be connected to a speaker (not shown) to supply the system power supply voltage Vcc4 or the USB voltage $V_{USB}$ to the speaker. An IC other than the notification unit (IC different from the IC shown in FIG. 10) may be connected to the input terminal VBUS of the charging IC 2. At least one of the notification unit and the different IC is preferably connected as a load to the input terminal VBUS of the charging IC 2.

The inhaler 100 includes a first discharge path that supplies electric power from the power supply BAT to the MCU 1 via the charging IC 2, and a second discharge path that supplies electric power from the power supply BAT to the heater HTR without passing through the charging IC 2. Therefore, a value of a current (maximum current that can be output from the output terminal SYS of the charging IC 2) to be supplied to the first discharge path may be smaller than a value of a current to be supplied to the second discharge path. Therefore, an expensive and large-scale charging IC 2 capable of withstanding a large current is not required, and the size and cost of the inhaler 100 can be reduced. Although the MCU 1 and the heater HTR can operate simultaneously, even when the MCU 1 and the heater HTR operate simultaneously, since the first discharge path and the second discharge path exist, sufficient electric power can be supplied to the charging IC 2 without applying an excessive load to the charging IC 2.

According to the inhaler 100, the second discharge path through which a large current flows is provided on a different substrate from the first discharge path. Specifically, the first discharge path is provided in the MCU-mounted substrate 161, and the second discharge path is provided in the receptacle-mounted substrate 162. Therefore, heat concentration on one substrate can be avoided, and the durability of the inhaler 100 can be improved.

According to the inhaler 100, all the electronic components receiving electric power from the power supply BAT without passing through the charging IC 2 are provided on the same substrate (receptacle-mounted substrate 162). Therefore, it is possible to prevent the electric circuit from becoming complicated.

According to the inhaler 100, the step-up DC-DC converter 9 is provided in a discharge path for discharging from the power supply BAT to the heater HTR. Therefore, a large amount of electric power can be supplied to the heater HTR by the step-up DC-DC converter 9 without considering the maximum current of the output terminal SYS of the charging IC 2. Therefore, it is possible to efficiently heat the rod 500 by the heater HTR while realizing cost reduction and miniaturization of the inhaler 100.

The inhaler 100 includes a discharge path (path from the receptacle RCP to the LEDs L1 to L8) for discharging to the LEDs L1 to L8 without passing through the charging IC 2 at the time of the USB connection. Accordingly, compared to a case where a path for discharging from the external power supply to the LEDs L1 to L8 via the charging IC 2 is provided, the expensive and large-scale charging IC 2 capable of withstanding a large current is not necessary. Therefore, it is possible to reduce the cost and size of the inhaler 100.

In the inhaler 100, the electronic component connected to the input terminal VBUS of the charging IC 2 is an IC different from the notification unit such as the LEDs L1 to L8 or the illustrated IC. Therefore, it is possible to prevent the electric power from the external power supply in which the noise and inrush current are likely to be mixed from being supplied to precise electronic components such as the MCU 1, the step-up/step-down DC-DC converter 8, the ROM 6, the battery gauge IC 12, the protection IC 10, and the step-up DC-DC converter 9, and to improve durability.

In the inhaler 100, the overvoltage protection IC 11 is provided between the LSW 3 and the receptacle RCP. With the presence of the overvoltage protection IC 11, the noise and inrush current that may occur at the moment of USB connection can be blocked not only by the LSW 3 but also by the overvoltage protection IC 11. Accordingly, it is possible to improve the durability of the inhaler 100.

In the inhaler 100, each of the LEDs L1 to L8 does not operate unless a built-in switch of the MCU 1 is turned on. Therefore, it is possible to prevent the noise and inrush current immediately after the USB connection from being supplied to the LEDs L1 to L8, and it is possible to reduce the possibility that the LEDs L1 to L8 fail. Since the switch is built in the MCU 1, the durability of the switch can be improved as compared with a case where the switch is provided outside the MCU 1.

Among the voltages supplied to the load by the inhaler 100, the system power supply voltage Vcc4 and the drive voltage $V_{bst}$ are the large ones. The system power supply voltage Vcc4 is generated from each of the electric power from the external power supply and the electric power from the power supply BAT. Further, the drive voltage $V_{bst}$ is generated only by the electric power from the power supply BAT. In this way, since the drive voltage $V_{bst}$ is not generated from the electric power of the external power supply, a line through which a high-voltage electric power flows is not complicated. Accordingly, it is possible to reduce the cost of the inhaler 100 by avoiding complication of the circuit. A power supply path to which the electric power including the system power supply voltage Vcc4 is supplied and a power supply path to which the electric power including the drive voltage $V_{bst}$ is supplied are present on different substrates. Specifically, the power supply path to which the electric power including the system power supply voltage Vcc4 is supplied is provided in the MCU-mounted substrate 161 and the LED-mounted substrate 163. The power supply path to which the electric power including the drive voltage $V_{bst}$ is supplied is provided in the receptacle-mounted substrate 162. As described above, since the two power supply paths to which the high voltage is applied are provided on the different substrates, it is possible to prevent the noise of the power supply paths from being superimposed on each other and becoming difficult to cope with. Therefore, the inhaler 100 can be stably operated.

In the inhaler 100, the power supply connector connected to the power supply BAT, the receptacle RCP connected to the external power supply, and the heater connector Cn connected to the heater HTR are provided on the same substrate (receptacle-mounted substrate 162). This prevents the generation of heat at various locations in the inhaler 100, thereby improving the durability of the inhaler 100.

Although various embodiments have been described above with reference to the drawings, the disclosure is not limited to these examples. It is apparent to those skilled in the art that various modifications or corrections can be conceived within the scope described in the claims, and it is understood that the modifications or corrections naturally fall within the technical scope of the disclosure.

For example, a connector for connecting a heater (a heating object is different from the heater HTR) different from the heater HTR and other loads may be connected between the output terminal VOUT of the step-up DC-DC converter 9 and the ground line.

In FIG. 10, a parallel circuit of a circuit including the switch S3 and a circuit including the switch S4 and the resistor Rs is connected between the output terminal VOUT of the step-up DC-DC converter 9 and the positive electrode side of the heater connector Cn. However, the parallel circuit may be connected between the negative electrode side of the heater connector Cn and the switch S6, and the output terminal VOUT of the step-up DC-DC converter 9 may be directly connected to the positive electrode side of the heater connector Cn.

In the present description, at least the following matters are described. In parentheses, corresponding constituent components and the like in the above embodiments are indicated, but the disclosure is not limited thereto.

(1) A power supply unit (inhaler 100) of an aerosol generation device that generates an aerosol by heating an aerosol source (rod 500), the power supply unit including:
- a power supply (power supply BAT);
- a connector (receptacle RCP) electrically connectable to an external power supply;
- a first load (MCU 1);
- a charging IC (charging IC 2) including an input terminal (input terminal VBUS) connected to the connector, a charging terminal (charging terminal bat) connected to the power supply, and an output terminal (output terminal SYS) connected to the first load, and configured to convert electric power input to the input terminal and output the converted electric power from the charging terminal; and a discharge path configured to connect the power supply and a second load (heater HTR) without passing through the charging IC, in which the charging IC is configured to supply electric power input from the power supply to the charging terminal to the first load via the output terminal.

According to (1), since there is a discharge path for discharging to the second load without passing through the charging IC, a load connected to the output terminal of the charging IC can be reduced. This eliminates the need for an expensive and large-scale charging IC capable of withstanding a large current, thereby achieving cost reduction and miniaturization of the aerosol generation device.

(2) The power supply unit for the aerosol generation device according to (1), in which the first load and the second load operate simultaneously.

According to (2), even when the two loads operate simultaneously, the load on the charging IC is not excessive. Therefore, it is possible to supply sufficient electric power to the two loads and operate the two loads sufficiently.

(3) The power supply unit for the aerosol generation device according to (2), further including:

a first substrate (MCU-mounted substrate 161); and a second substrate (receptacle-mounted substrate 162) different from the first substrate, in which the charging IC and the first load are provided on the first substrate, and the discharge path is provided in the second substrate.

According to (3), a path from the power supply to the first load via the charging IC and a path from the power supply to the second load exist on different substrates. Therefore, heat concentration on one substrate can be avoided, and durability of the aerosol generation device can be improved.

(4) The power supply unit for the aerosol generation device according to any one of (1) to (3), in which power consumption of the first load is less than power consumption of the second load.

According to (4), the charging IC does not need to discharge to the second load that consumes a large amount of electric power. Therefore, it is possible to use a more inexpensive and small-scale charging IC and realize cost reduction and miniaturization of the aerosol generation device.

(5) The power supply unit for the aerosol generation device according to (4), in which the second load consumes a largest amount of electric power among loads provided in the aerosol generation device.

According to (5), the charging IC does not need to discharge to the second load that consumes a largest amount of electric power. Therefore, it is possible to use a more inexpensive and small-scale charging IC and realize cost reduction and miniaturization of the aerosol generation device.

(6) The power supply unit for the aerosol generation device according to any one of (1) to (5), in which the discharge path includes a step-up converter (step-up DC-DC converter 9) configured to step up an output voltage (power supply voltage $V_{BAT}$) of the power supply and apply the step-up output voltage to the second load.

According to (6), since it is not necessary to pass the large electric power that is to be stepped up or has been stepped up through the charging IC while improving an operating efficiency of the second load, it is possible to increase an effect of the second load while reducing the cost and size of the aerosol generation device.

(7) The power supply unit for the aerosol generation device according to (6), further including:

a third load (protection IC 10) connected to a node between the power supply and the step-up converter in the discharge path and configured to operate by electric power supplied from the node.

According to (7), since there is a discharge path for discharging to the third load without passing through the charging IC, an expensive and large-scale charging IC capable of withstanding a large current is not necessary. Therefore, cost reduction and miniaturization of the aerosol generation device can be realized.

(8) The power supply unit for the aerosol generation device according to (7), further including:

a power supply connector to which the power supply is connected;

a first substrate (MCU-mounted substrate 161);

a second substrate (receptacle-mounted substrate 162) different from the first substrate, in which the charging IC is provided on the first substrate, and the discharge path and the third load are provided on the second substrate.

According to (8), a discharge route not passing through the charging IC is concentrated on one substrate. Therefore, it is possible to prevent complication of circuits on the substrate and realize cost reduction and miniaturization of the aerosol generation device.

(9) The power supply unit for the aerosol generation device according to any one of (1) to (8), further including:

a voltage converter (step-up/step-down DC-DC converter 8) connected between the output terminal and the first load and configured to output a constant voltage.

According to (9), since the constant voltage can be supplied to the first load, the operation of the first load is stabilized.

(10) The power supply unit for the aerosol generation device according to (9), in which the charging IC is configured to supply electric power input to the input terminal to the first load via the output terminal ($V_{USB}$ power path function), and the voltage converter steps up or down a voltage input from the charging IC to output the constant voltage when electric power input from the charging terminal is output from the output terminal (when a $V_{BAT}$ power path function is enabled), and steps down the voltage input from the charging IC to output the constant voltage when electric power input from the input terminal is output from the output terminal (when the $V_{USB}$ power path function is enabled).

According to (10), regardless of whether the external power supply or the power supply is used, the constant voltage is supplied to the first load, thereby stabilizing the operation of the first load.

Although various embodiments have been described above with reference to the drawings, the disclosure is not limited to these examples. It is apparent to those skilled in the art that various modifications or corrections can be conceived within the scope described in the claims, and it is understood that the modifications or corrections naturally fall within the technical scope of the disclosure. In addition, respective constituent elements in the above embodiments may be optionally combined without departing from the gist of the disclosure.

What is claimed is:

1. A power supply unit for an aerosol generation device that generates an aerosol by heating an aerosol source, the power supply unit comprising:

a power supply;

a connection receptacle electrically connectable to an external power supply;

a first load;

a charging integrated circuitry (IC) including an input terminal connected to the connection receptacle, a charging terminal connected to the power supply, and an output terminal connected to the first load, wherein the charging IC is configured to convert electric power input to the input terminal and output the converted electric power from the charging terminal;

a discharge path configured to connect the power supply and a second load without passing through the charging IC, wherein the charging IC is configured to supply electric power input from the power supply to the charging terminal to the first load via the output terminal, and the first load is a microcontroller configured to control heating the aerosol source by the second load and includes a single electric element;

a first substrate; and a second substrate different from the first substrate, wherein the charging IC and the first load are provided on the first substrate, the discharge path is provided in the second substrate, and the first load and the second load operate simultaneously.

2. The power supply unit for the aerosol generation device according to claim 1, wherein power consumption of the first load is less than power consumption of the second load.

3. The power supply unit for the aerosol generation device according to claim 2, wherein the second load consumes a largest amount of electric power among loads provided in the aerosol generation device.

4. The power supply unit for the aerosol generation device according to claim 1, wherein the discharge path is configured to step up an output voltage of the power supply and apply the step-up output voltage to the second load.

5. The power supply unit for the aerosol generation device according to claim 4, further comprising:

a third load connected to a node between the power supply and the second load in the discharge path and configured to operate by electric power supplied from the node.

6. The power supply unit for the aerosol generation device according to claim 1, further comprising:

a voltage converter connected between the output terminal and the first load and configured to output a constant voltage.

7. The power supply unit for the aerosol generation device according to claim 6, wherein the charging IC is configured to supply electric power input to the input terminal to the first load via the output terminal, and the voltage converter steps up or down a voltage input from the charging IC to output the constant voltage when electric power input from the charging terminal is output from the output terminal, and steps down the voltage input from the charging IC to output the constant voltage when electric power input from the input terminal is output from the output terminal.

8. The power supply unit for the aerosol generation device according to claim 6, wherein the voltage converter is configured to step down a voltage input from the charging IC to output the constant voltage.

9. The power supply unit for the aerosol generation device according to claim 1, further comprising:

a thermistor arranged in contact with or close to the second load;

a power supply line connected to the thermistor; and a load switch including a control terminal connected to the first load, an input terminal connected to the output terminal of the charging IC, and an output terminal connected to the power supply line.

10. The power supply unit for the aerosol generation device according to claim 1, wherein the power supply unit is an inhaler.

11. The power supply unit for the aerosol generation device according to claim 1, wherein the second load is a heater.

12. The power supply unit for the aerosol generation device according to claim 1, wherein the second load is an induction heater.

13. The power supply unit for the aerosol generation device according to claim 1, wherein the discharge path includes a step-up converter configured to step up an output voltage of the power supply and apply the step-up output voltage to the second load.

14. The power supply unit for the aerosol generation device according to claim 13, further comprising:

a third load connected to a node between the power supply and the step-up converter in the discharge path and configured to operate by electric power supplied from the node.

15. A power supply unit for an aerosol generation device that generates an aerosol by heating an aerosol source, the power supply unit, comprising:

a power supply;

a connection receptacle electrically connectable to an external power supply;

a first load;

a charging integrated circuitry (IC) including an input terminal connected to the connection receptacle, a charging terminal connected to the power supply, and an output terminal connected to the first load, wherein the charging IC is configured to convert electric power input to the input terminal and output the converted electric power from the charging terminal;

a discharge path configured to connect the power supply and a second load without passing through the charging IC, wherein the charging IC is configured to supply electric power input from the power supply to the charging terminal to the first load via the output terminal, the first load is a microcontroller configured to control heating the aerosol source by the second load and includes a single electric element, and the discharge path is configured to step up an output voltage of the power supply and apply the step-up output voltage to the second load, a power supply connector to which the power supply is connected;

a first substrate;

a second substrate different from the first substrate, wherein the charging IC is provided on the first substrate, and the discharge path and the third load are provided on the second substrate; and a third load connected to a node between the power supply and the second load in the discharge path and configured to operate by electric power supplied from the node.

16. The power supply unit for the aerosol generation device according to claim 15, wherein the third load is a protection IC.

* * * * *